US007275988B2

(12) United States Patent

Aida et al.

(10) Patent No.: US 7,275,988 B2

(45) Date of Patent: Oct. 2, 2007

(54) SLOT MACHINE

(75) Inventors: Eiji Aida, Tokyo (JP); Keiri Yoshioka, Tokyo (JP)

(73) Assignee: Konami Gaming Incorporated, Las Vegas, NV (US)

( * ) Notice: Subject to any disclaimer, the term of this patent is extended or adjusted under 35 U.S.C. 154(b) by 544 days.

(21) Appl. No.: 10/322,642

(22) Filed: Dec. 19, 2002

(65) Prior Publication Data

US 2003/0130028 A1 Jul. 10, 2003

(30) Foreign Application Priority Data

Jan. 10, 2002 (JP) .......................... P2002-003147

(51) Int. Cl.
*A63F 13/00* (2006.01)
*G07F 17/34* (2006.01)

(52) U.S. Cl. .......................................... 463/20; 463/16

(58) Field of Classification Search ............ 463/16–20, 463/30–34; 273/142 R, 143 R, 142 A, 142 B, 273/138.1, 139, 271

See application file for complete search history.

(56) References Cited

U.S. PATENT DOCUMENTS 4,448,419 A * 5/1984 Telnaes ...................... 463/21
5,152,529 A * 10/1992 Okada ......................... 463/20
5,375,830 A 12/1994 Takemoto et al.
5,395,111 A * 3/1995 Inoue ..................... 273/143 R
5,580,055 A * 12/1996 Hagiwara ............... 273/143 R
5,752,881 A * 5/1998 Inoue .......................... 463/20
6,004,208 A * 12/1999 Takemoto et al. ............ 463/20
6,027,115 A * 2/2000 Griswold et al. ....... 273/143 R
6,086,066 A * 7/2000 Takeuchi et al. ........ 273/143 R
6,164,645 A * 12/2000 Weiss ...................... 273/138.2

FOREIGN PATENT DOCUMENTS

GB 2124003 A * 2/1984

* cited by examiner

*Primary Examiner*—Robert E Pezzuto
(74) *Attorney, Agent, or Firm*—Sughrue Mion Pllc.

(57) ABSTRACT

Each of a plurality of reels is provided with a plurality of symbols including at least one special symbol. At least one payline is extending across the reels. At least one electro-optical panel includes a first transparent substrate and a second transparent substrate which sandwiches an electro-optical substance therebetween. At least one of the first transparent substrate and the second transparent substrate is formed with at least one bored portion having a shape substantially coincident with an contour of the special symbol, the electro-optical panel disposed in front of each of the reels such that the bored portion is placed on the payline. A controller controls a state of the electro-optical substance in accordance with a predetermined rule to adjust a transparency of the electro-optical panel.

19 Claims, 12 Drawing Sheets

SLOT MACHINE

BACKGROUND OF THE INVENTION

The invention relates to a slot machine.

A slot machine usually comprises three reels, three reel stop buttons assigned to the respective reels, and a start lever to be used for starting a game. When a player lowers the start lever, all reels start spinning simultaneously. At timings at which the player has pressed the reel stop buttons, the reels come to a halt. Among combinations of symbols aligned with a payline while the reels remain stationary, a combination of symbols which imparts a gaming value is called a winning combination. When a combination of symbols that constitutes a winning combination is aligned with a valid payline, a win arises. Upon occurrence of a win, a player can acquire tokens in a number determined on the basis of the winning combination by which the win has been determined.

Here, a win is determined in two steps. A first step is called internal lottery. In relation to internal lottery, random number selection is performed at a timing at which the start lever is actuated, to thereby determine a prize group in which a win is to be determined or a failure. Internal lottery information showing a result of random number selection is generated. Namely, a one-to-one correspondence arises between a prize group and a winning combination, or a plurality of winning combinations may correspond to one prize group.

In a second step, positions at which reels are to be stopped are controlled in accordance with actuation of the reel stop buttons. In a case where the internal lottery information represents a failure, even when a player has actuated reel stop buttons at a timing when symbols that would constitute a certain winning combination approach a valid payline, a control operation is performed such that timings at which the reels are to be stopped are delayed, to thereby hinder the symbols from coming to a halt along the valid payline.

In contrast, in a case where a win has been determined for a certain prize group through internal lottery, even when the player has actuated the reel stop buttons at slightly earlier timings, a draw-in control operation is performed such that symbols that would constitute a winning combination corresponding to a prize group come to a halt at a payline. However, when the reel stop buttons are actuated at greatly-shifted timings, a win does not arise. In other words, in order to acquire a win, the player must acquire a win for a certain prize group and align, along a valid payline, symbols that constitute a winning combination corresponding to the thus-determined prize group.

In a certain type of slot machine, a gaming status is shifted to a big bonus when certain symbols are aligned. Here, a big bonus means a series of games which enable a player to acquire a larger payout than in a basic game. A prize group corresponding to a big bonus is called a BB prize.

Incidentally, a slot machine performs a presentation by utilization of internal lottery information. Typical presentation is to display on a liquid-crystal display device or display an animation representing occurrence of a win for a BB prize, such that characters representing a prize group for which a win has been determined on the basis of internal lottery information are displayed on the liquid-crystal display device. Another typical presentation is to display various kinds of characters on mechanical reels, to thereby spin the reels. In short, the way of presentation is different according to the type of a slot machine. Moreover, the way of presentation tends to be complicated for grabbing a player's attention.

However, when a player first plays a game on an unfamiliar slot machine, in many cases the player does not understand the meaning of a presentation even when elaborate presentation is offered. In other words, rules of a game are not clearly linked to the presentation, thereby creating confusion for the player. Particularly, a beginner who has played a few games on a slot machine becomes bewildered when viewing the presentation.

Even when having realized a prize group for which a win has been determined through internal lottery, the player will not achieve a win if he or she has failed to actuate the reel stop buttons at predetermined timings. For this reason, in order to acquire a win, the player is required to have the skill of determining symbols on spinning reels.

However, spinning symbols appear to roll down for a less-skilled player, thus posing difficulty in determining individual symbols. Consequently, even when having realized a prize group for which a win has been determined, a less-skilled player cannot acquire a win.

SUMMARY OF THE INVENTION

It is therefore an object of the invention to provide a slot machine which enables a player to clearly ascertain rules of a game and which enables a less-skilled player to enjoy playing games.

In order to achieve the above object, according to the invention, there is provided a slot machine, comprising:

a plurality of reels, each provided with a plurality of symbols including at least one special symbol;

at least one payline, extending across the reels;

at least one electro-optical panel, including a first transparent substrate and a second transparent substrate which sandwiches an electro-optical substance therebetween, at least one of the first transparent substrate and the second transparent substrate formed with at least one bored portion having a shape substantially coincident with an contour of the special symbol, the electro-optical panel disposed in front of each of the reels such that the bored portion is placed on the payline; and a controller, which controls a state of the electro-optical substance in accordance with a predetermined rule to adjust a transparency of the electro-optical panel.

In such a configuration, when the transparency of the electro-optical panel is adjusted, a non-mask area is formed by the bored portion, whereas non-bored portion forms a mask area. Since the non-mask area coincident with the contour of the special symbol is situated on the payline, a player can infer rules that a win is achieved when a special symbol whose contour matches the shape of the non-mask area is stopped at the payline, without detailed knowledge about the rules of a game. In other words, rules of the game can be communicated to a player intuitively without literal or linguistic descriptions of the rules. Further, the player infers rules during the course of progress in a game. Hence, the player can readily comprehend a game within a short period of time. Further, even a beginner who has no knowledge of rules can quickly enjoy playing games.

When the masking operation is performed, a symbol in each non-mask area is highlighted, whereas a symbol in each mask area becomes unnoticeable. Since a special symbol passing through the non-mask area becomes clearly discernible, even a beginner can stop special symbols on the payline. Consequently, a difference in level of skill among players is diminished, thereby enabling all players to enjoy playing games.

Moreover, a process in which special symbol is stopped at the non-mask area is analogous to a case where specific piece is fitted into predetermined holes or frames in a puzzle game. The player can feel satisfaction by completing an object by fitting the special symbol into the non-mask area. In addition, stoppage of the specific symbol in the non-mask area coincides with winning requirements of rules of the game. Hence, the invention yields a presentation effect of the ability to impart a great feeling of enjoyment to the player.

In addition, since the bored portion is formed in the electro-optical panel, and the bored portion is caused to match in shape with the geometry of the special symbol. Hence, the only requirement is to form a transparent electrode over the entire mutually-opposing surfaces of the first and second transparent substrates. Consequently, the structure of the electro-optical panel can be simplified.

Preferably, the slot machine further comprises a random number selector, which determines one of a plurality of lottery results including at least one special lottery result corresponding to the special symbol, to generate internal information indicating the determined one of the lottery results. The controller makes the electro-optical panel translucent when the internal information indicates that the determined one of the lottery results is the special lottery result.

In such a configuration, the player can be informed that a win is determined through an internal lottery. Further, the electro-optical panel is interposed between the reels and the player, and hence the mask area and the non-mask area appear in the line of sight along which the player stares during the course of a game. Consequently, the player does not need to shift his/her line of sight. The player can therefore enjoy playing games over a long period of time without involvement of eye fatigue. In addition, the player can clearly view the special symbol every time the special symbol passes through the non-mask area. Hence, the player can readily stop reels in synchronism with the timing at which the specific symbol passes through the non-mask area.

Alternatively, it is preferable that the slot machine further comprises a random number selector, which determines one of a plurality of lottery results including a plurality of special lottery results corresponding to a plurality of special symbols, to generate internal information indicating the determined one of the lottery results. A plurality of electro-optical panels are provided in association with the plurality of special symbols. The controller makes one of the electro-optical panels associated with one of the special symbols translucent when the internal information indicates that the determined one of the lottery results is one of the special lottery results corresponding to the one of the special symbols, while the controller makes the other electro-optical panels transparent.

In such a configuration, a player can be informed that a win is determined through an internal lottery. For instance, a determination may be made as to whether or not the player is playing a super bonus big game, which may be used for informing the player of determination of a win for a small winning combination during the course of the super big bonus game.

According to the invention, there is also provided a slot machine, comprising:

a plurality of reels, each provided with a plurality of symbols including at least one special symbol;

at least one payline, extending across the reels;

an electro-optical panel, including a first transparent substrate and a second transparent substrate which sandwiches an electro-optical substance therebetween, the electro-optical panel disposed so as to cover at least one of the reels; and a controller, which displays at least one mask image on the electro-optical panel in accordance with a predetermined rule, the mask image including a mask area and at least one non-mask area having a shape substantially coincident with an contour of the special symbol, and having a transparency higher than a transparency of the mask area, the mask image displayed such that the non-mask area is placed on the payline.

Also in such a configuration, rules of the game can be communicated to a player intuitively without literal or linguistic descriptions of the rules. Further, a difference in level of skill among players is diminished, thereby enabling all players to enjoy playing games. Moreover, the player is imparted with a feeling of satisfaction as if having completed a set-in puzzle.

Preferably, at least one of transparent electrodes formed on opposing faces of the first transparent substrate and the second transparent substrate has a shape substantially coincident with the non-mask area.

In this case, the only requirement is to set the shape of the transparent electrode so as to be coincident with the non-mask area. As compared with a case where the bored portion is formed in an electro-optical panel, the structure thereof is simplified, thereby enabling cost reduction. Simultaneously, a process for filling a space defined between the first and second substrates with the electro-optical substance can be facilitated.

Preferably, the electro-optical panel including a plurality of pixels arranged in a matrix manner, so that a transparency of each of the pixels is adjustable. In this case, the electro-optical panel enables display of the mask image in the form of a dot display and use of a general-purpose electro-optical panel.

Preferably, the slot machine further comprises a random number selector, which determines one of a plurality of lottery results including at least one special lottery result corresponding to the special symbol, to generate internal information indicating the determined one of the lottery results. The controller displays the mask image on the electro-optical panel when the internal information indicates that the determined one of the lottery results is the special lottery result.

In such a configuration, a player can be informed that a win is determined through an internal lottery. Further, since the electro-optical panel is interposed between the reels and the player, the mask area and the non-mask area appear in the line of sight in which the player stares during the course of a game. Consequently, the player does not need to shift his/her line of sight. The player can therefore enjoy playing games over a long period of time without involvement of eye fatigue. In addition, the player can clearly view the special symbol every time the special symbol passes through the non-mask area. Hence, the player can readily stop reels in synchronism with the timing at which the special symbol passes through the non-mask area.

Preferably, the slot machine further comprises a storage which stores at least one mask data adapted to display the at least one mask image. The controller reads out the mask data in the storage to display the mask image on the electro-optical panel. In this case, the mask data may be data of bit map format. Further, the mask data may be one-bit data to be used for distinguishing a mask area from a non-mask area on a per-pixel basis. By such a data structure, the storage capacity of the storage section can be reduced. When a one-bit data structure is employed, a first voltage to be used for displaying an image in a mask area and a second voltage to be used for displaying an image in a non-mask area may be determined beforehand. In accordance with a data value of the mask data, one is selected from the first and second voltages, and the thus-selected voltage is supplied to the electro-optical panel.

Here, it is preferable that the slot machine further comprises a random number selector, which determines one of a plurality of lottery results including a plurality of special lottery results corresponding to a plurality of special symbols, to generate internal information indicating the determined one of the lottery results. The controller reads out one of a plurality of mask data in the storage to display one of a plurality of mask images on the electro-optical panel when the internal information indicates that the determined one of the lottery results is one of the special lottery results corresponding to the one of the special symbols.

In such a configuration, a player can be informed that a win is determined through an internal lottery. For instance, a determination may be made as to whether or not the player is playing a super bonus big game, which may be used for informing the player of determination of a win for a small winning combination during the course of the super big bonus game.

Preferably, the slot machine further comprises: a main body, which houses the reels therein; and a door, attached to the main body, the door formed with a transparent window through which a player is able to see the reels. The electro-optical panel disposed along an inner face of the transparent window.

In such a configuration, the electro-optical panel can be protected by display windows. Here, if the window is curved, the first and second transparent substrates are formed preferably from flexible material. In this case, the electro-optical panel can be flexed, but transparent plastic is preferable as material for the first and second transparent substrates used in such an electro-optical panel. Further, in terms of heat-resisting properties, use of polyethersulfone (PES) is preferable because the electro-optical panel can be fixed in a curved form along the inner face of the window. If the window is flat, in addition to flexible material, non-flexible material can also be used for the first and second transparent substrates. Glass or the like material can be used as non-flexible material.

Preferably, the controller shifts a gaming status of the slot machine from a first, basic gaming status to a second gaming status which provides higher gaming value than the first gaming status, when a predetermined combination of the symbols including the special symbol are aligned on the payline. In the specification, the first gaming status corresponds to a basic game, and the second gaming status corresponds to a big bonus game.

The present invention can be applied to a slot machine which does not requires buttons for stopping reels (the reels are spun by a start lever or button and stop automatically). In such a case, the first gaming status corresponds to a primary game, and the second gaming status corresponds to a jackpot game including a secondary game, a progressive chance game or the like.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE PREFERRED EMBODIMENTS

Embodiments of the invention will be described hereinbelow by reference to the accompanying drawings. Here, an explanation is given of a case where the invention is applied to a slot machine.

Figure 1:
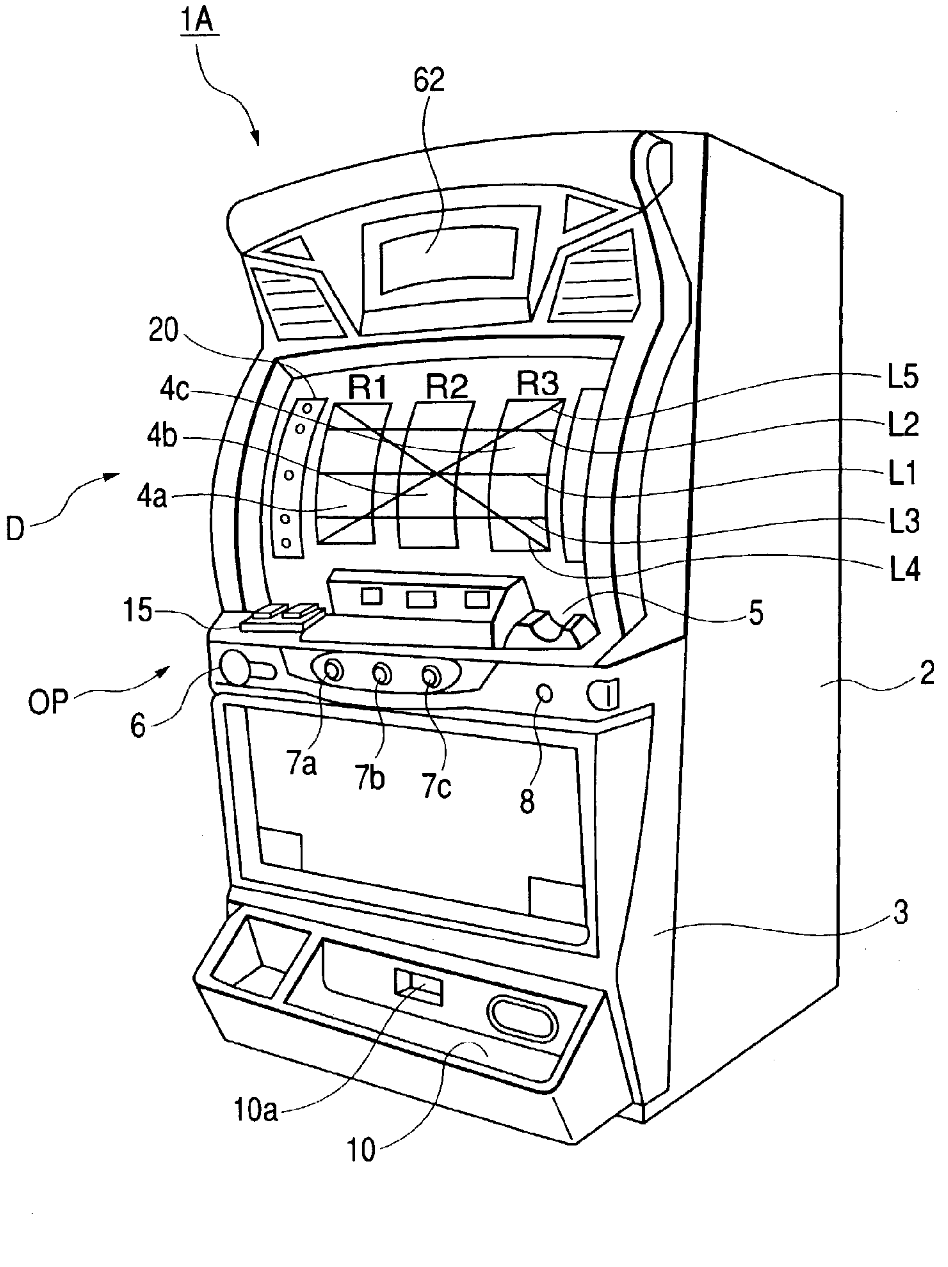
FIG. 1 is a perspective view showing the appearance of a slot machine according to a first embodiment of the invention.

As shown in FIG. 1, a slot machine 1A according to a first embodiment of the invention comprises a main unit 2 and a front door 3 attached to the front of the main unit 2. A liquid-crystal display device 62 for providing a player with predetermined information is provided at an upper portion of the front door 3. A panel display section D disposed at a middle portion of the front door 3 has three vertically-oriented rectangular display windows 4*a*, 4*b*, and 4*c*. The display windows 4*a*, 4*b*, and 4*c* are formed from transparent material; e.g., acrylic resin. Three horizontal paylines L1 through L3 and two inclined paylines L4 and L5 are provided across the display windows 4*a*, 4*b*, and 4*c*.

In addition, an auxiliary display section 20 is provided on the left side of the display window 4*a*. The auxiliary display section 20 comprises five LEDs assigned to the respective paylines L1 through L5. When a player inserts tokens or performs a betting operation to be described later, one or more of the paylines L1 through L5 are made valid, in a number corresponding to the number of tokens bet. In the slot machine 1A, when one token is bet, the payline L1 becomes valid. When two tokens are bet, the paylines L1 through L3 become valid. When three tokens are bet, the paylines L1 through L5 become valid. LEDs constituting the auxiliary display section 20 are illuminated when corresponding paylines L1 through L5 are valid. In contrast, the LEDs become extinguished when the corresponding paylines L1 through L5 are invalid. Thus, the player can ascertain valid lines from among the paylines L1 through L5.

Figure 2:
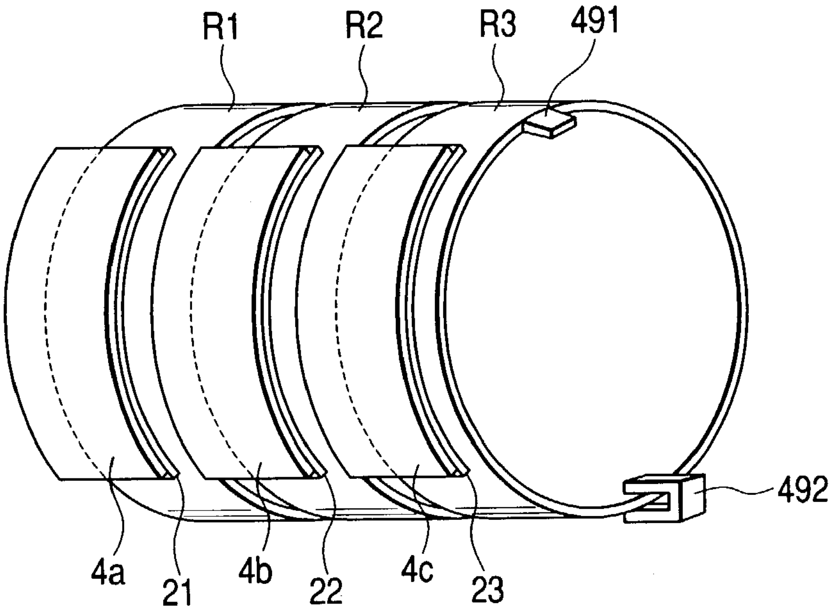
FIG. 2 is a perspective view showing the structure of a panel display section and a peripheral configuration thereof.

FIG. 2 shows the structure of the panel display section D and a peripheral configuration thereof. A left reel liquid-crystal panel 21 is laminated on an internal peripheral wall of the display window 4*a;* a center reel liquid-crystal panel 22 is laminated on an internal peripheral wall of the display window 4*b;* and a right reel liquid-crystal panel 23 is laminated on an internal peripheral wall of the display window 4*c*. The left, center, and right reel liquid-crystal display panels 21 through 23 can, adjust transparency, thereby changing a transparent state thereof among an opaque state, a translucent state, and a transparent state.

Three rows of reels, on whose outer peripheral faces a plurality of kinds of symbols are drawn; that is, a left reel R1, a center reel R2, and a right reel R3, are rotatably disposed at the inside of the panel display section D. Consequently, if the left reel liquid-crystal panel 21, the center reel liquid-crystal panel 22, and the right reel liquid-crystal panel 23 are transparent, the player can observe symbols on the left reel R1 by way of the display window 4*a,* those on the center reel R2 by way of the display window 4*b,* and those on the right reel R3 by way of the display window 4*c*.

A shading piece 491 projects from a portion of a reel main body of the right reel R3. When the right reel R3 spins, the shading piece 491 runs across a photo coupler 492. As in the case of the right reel R3, the shading piece 491 and the photocoupler 492 are provided on each of the left reel R1 and the center reel R2.

The left reel liquid-crystal panel 21, the center reel liquid-crystal panel 22, and the right reel liquid-crystal panel 23 are transparent panels. Each of the panels is formed from first and second substrates with liquid crystal being sandwiched therebetween. The first and second substrates are formed from a transparent, flexible material. For instance, transparent plastic can be used as material for the first and second substrates. In terms of heat-resisting properties, use of polyethersulfone (PES) is more preferable. Liquid-crystal has the property of changing the orientation of molecules in accordance with an applied voltage. Transparent electrodes are formed on mutually-opposing surfaces of the first and second substrates.

The transparency of liquid crystal changes in accordance with a voltage applied across transparent electrodes. The left reel liquid-crystal panel 21, the center reel liquid-crystal panel 22, and the right reel liquid-crystal panel 23 are constructed so as to operate in a normally-white mode. Consequently, when no voltage is applied across the transparent electrodes, each of the panels permits transmission of light. In contrast, when a voltage is applied across the transparent electrodes, each of the panels permits transmission of light at a transparency corresponding to the applied voltage. In the embodiment, a voltage V at which liquid crystal becomes translucent is applied across the transparent electrodes during a predetermined period of time.

Figure 3:
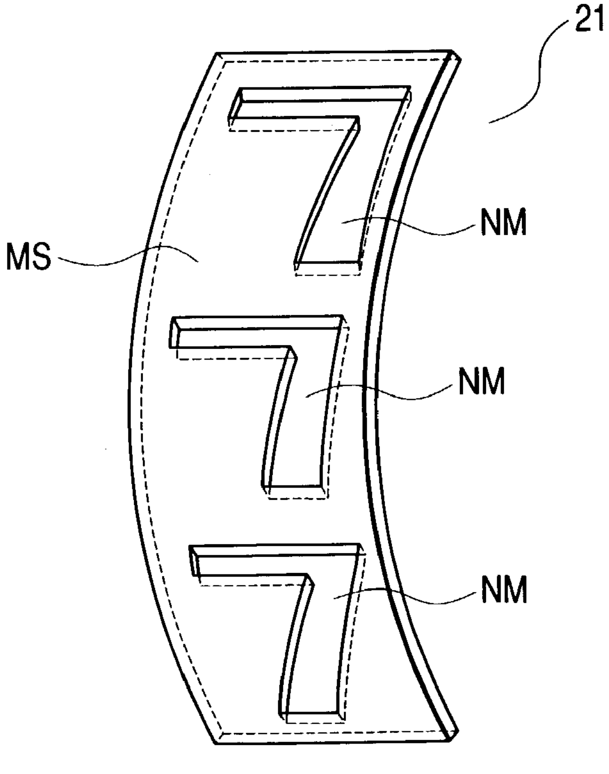
FIG. 3 is a perspective view showing an appearance of a left reel liquid-crystal panel.

FIG. 3 shows the appearance of the left reel liquid-crystal panel 21. As illustrated, the left reel liquid crystal panel 21 has three bored portions. In the following description, bored portions are referred to as non-mask areas (NM). The remaining area is referred to as a masked area (MS). Since liquid crystal is not present in the non-mask areas NM, light transmits through those areas at all times. In contrast, liquid crystal is present in the mask area MS, and hence the mask area MS becomes translucent when the voltage V is applied across the transparent electrodes of the left reel liquid-crystal panel 21. When a player views the display window 4*a* while the voltage V is applied across the transparent electrodes, a symbol on the left reel R1 is clearly viewed via the non-mask areas NM. In contrast, the symbol becomes blurred in the mask area MS.

The geometries of the non-mask area NM coincide with the contour of a specific symbol. In this embodiment, a red "7" symbol and a blue "7" symbol are specific symbols. As will be described later, when, among the symbols displayed on the left reel R1, those displayed on the center reel R2, and those displayed on the right reel R3, the red "7" symbols or the blue "7" symbols are aligned with a valid payline, a big bonus is determined. The big bonus provides the player with a chance of acquiring a large gaming value. Consequently, specific symbols provide the player with a special meaning.

Figure 4:
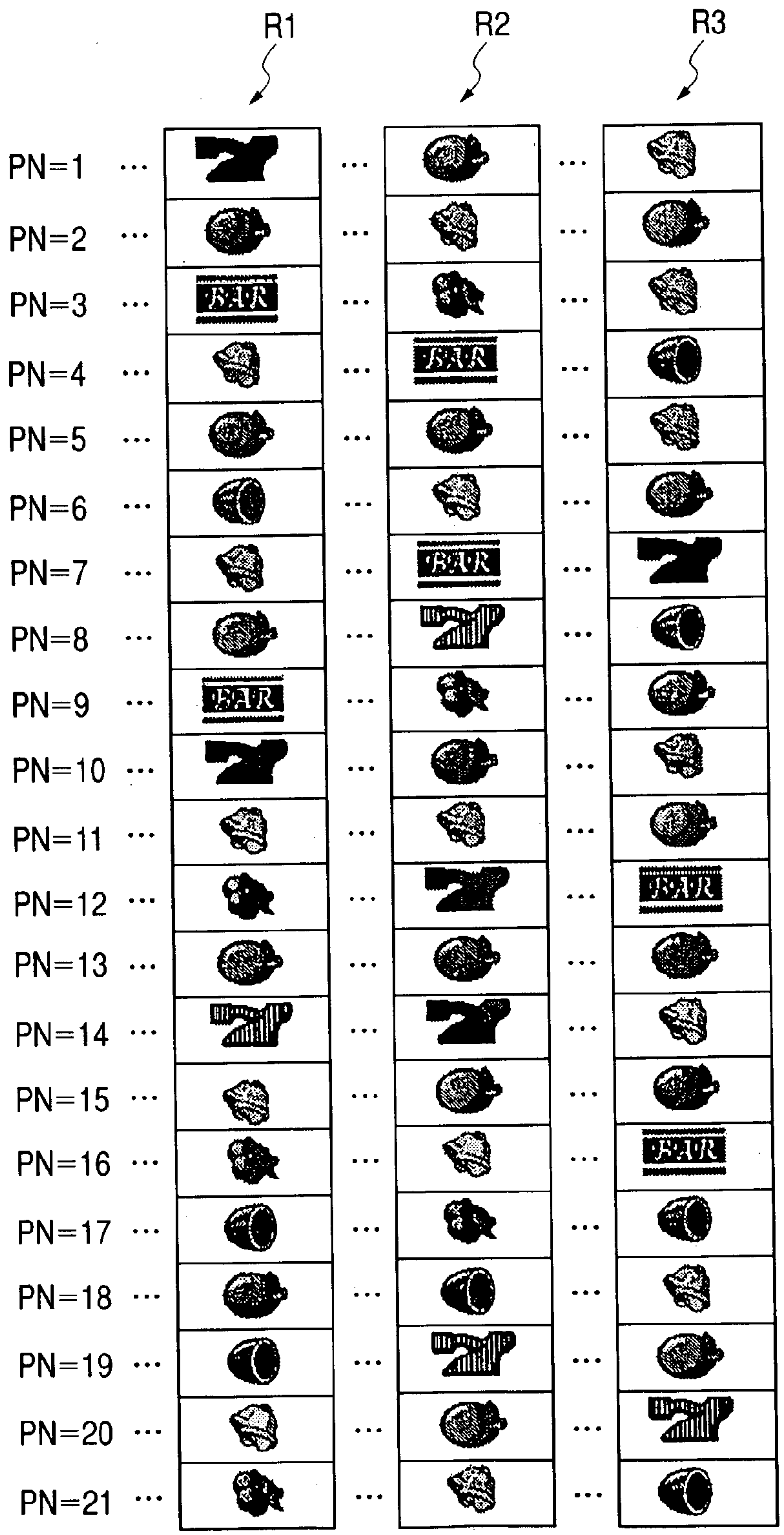
FIG. 4 is a descriptive view showing an example of symbols to be displayed on, a left reel, a center reel and a right reel.

FIG. 4 shows example symbols to be displayed on the left reel R1, those to be displayed on the center reel R2, and those to be displayed on the right reel R3. As illustrated, the symbols are appended symbol numbers PN=1 to 21. Here, a solid "7" depicts a red "7" (e.g., a symbol appended PN=1 on the left reel), and a hatched "7" depicts a blue "7" (e.g., a symbol appended PN=8 on the center reel).

In a play to be performed by the slot machine 1A, when a predetermined combination of symbols is aligned with any of the paylines L1 through L5 that has been made valid by insertion of tokens, tokens are ejected in a number corresponding to the winning combination. Tokens are to be inserted into the slot machine 1A before start of a game. Further, tokens are required for a player to continue playing games. In short, tokens can be said to be a medium having a gaming value, such as continuation of a game.

In the following description, from among combinations of symbols, a combination of symbols that would impart gaming values is called a "winning combination," and a combination of symbols that is worthless is called a "failure." The present embodiment employs the following winning combinations.

1) RED 7 winning combination is a combination of a symbol appended symbol number PN=1 or 10 on the left reel R1, a symbol appended symbol number PN=12 or 14 on the center reel R2, and a symbol appended symbol number PN=7 on the right reel R3.

2) BLUE 7 winning combination is a combination of a symbol appended symbol number PN=14 on the left reel R1, a symbol appended symbol number PN=8 or 19 on the center reel R2, and a symbol appended symbol number PN=20 on the right reel R3.

3) BAR winning combination is a combination of a symbol appended symbol number PN=3 or 9 on the left reel R1, a symbol appended symbol number PN=4 or 7 on the center reel R2, and a symbol appended symbol number PN=12 or 16 on the right reel R3.

4) BELL winning combination is a combination of a symbol appended symbol number PN=4, 7, 11, 15, or 20 on the left reel R1, a symbol appended symbol number PN=2, 6, 11, 16, or 21 on the center reel R2, and a symbol appended symbol number PN=1, 3, 5, 10, 14, or 18 on the right reel R3. The BELL winning combination offers a payout of seven tokens.

5) WATERMELON winning combination is a combination of a symbol appended symbol number PN=6, 17, or 19 on the left reel R1, a symbol appended symbol number PN=18 on the center reel R2, and a symbol appended symbol number PN=4, 8, 17, or 21 on the right reel R3. The WATERMELON winning combination offers a payout of 15 tokens.

6) CHERRY winning combination is established when any one of the symbols appended symbol numbers PN=12, 16, and 21 on the left reel R1 has stopped at a validated payline of the paylines L1 through L5, and stop positions of the other reels are irrelevant to this combination. The CHERRY winning combination yields a payout of two tokens.

7) PLUM winning combination is a combination of a symbol appended symbol number PN=2, 5, 8, 13, or 18 on the left reel R1, a symbol appended symbol number PN=1, 5, 10, 13, 15, or 20 on the center reel R2, and a symbol appended symbol number PN=2, 6, 9, 11, 13, 15, or 19 on the right reel R3 Even when a PLUM winning combination has been established, tokens are not paid out; however, the player can play a replay game. Here, a replay game means that a player can again play a game without insertion of new tokens.

In relation to these winning combinations, gaming values to be afforded to a player are determined in advance for each playing state. Winning combinations are divided into a winning combination for affording payout of 1 to 15 tokens; a winning combination for affording an advantageous gaming state, such as a big bonus or a regular bonus, regardless of whether or not tokens are paid for a win; and a winning combination for affording a replay game which enables a player to play a game again under conditions corresponding to insertion of the same number of tokens. Further, not all these winning combinations are always determined as wins in every gaming state; it may be possible for winning combinations to hold a win in a certain gaming state but to not constitute a win in another gaming state. More specifically, gaming values imparted to a player for each win originating from each winning combination are not always constant as previously determined for each gaming state.

In the embodiment, a gaming value to be imparted to players in an ordinary gaming state is seven tokens for the BELL winning combination; 15 tokens for the WATERMELON winning combination; two tokens for the CHERRY winning combination; and a replay game for the PLUM winning combination.

Of various kinds of winning combinations, winning combinations involving relatively low gaming values; e.g., payment of two to 15 tokens or affording of a replay game, as in the case of a BELL winning combination, a WATERMELON winning combination, a CHERRY winning combination, and a PLUM winning combination, are generally called small winning combinations.

When a win is determined through a BAR winning combination, the gaming state shifts to a specific gaming state called a regular bonus (hereinafter abbreviated as "RB," as required). In the regular bonus state, a jackpot game can be played 12 times. A period of RB expires when the player plays a jackpot game 12 times or achieves a win a maximum of eight times. A jackpot game is played by betting one token, to thereby make only the center payline L1 valid. A PLUM winning combination is adopted as a winning combination for a jackpot game. When symbols that would constitute this winning combination are aligned with the payline L1, the slot machine 1A ejects 15 tokens. In other words, even when a PLUM winning combination is aligned in an ordinary playing state, the player is allowed to play only a replay game. However, in a jackpot game to be played during a period of regular bonus, the player can be awarded 15 tokens when symbols that constitute a PLUM winning combination are aligned.

Further, during a period of big bonus, which will be described later, a PLUM winning combination is allocated to a win to be determined through a regular bonus. In the RG gaming state, a jackpot game which is not available in an ordinary gaming state is provided. The RG gaming state can be said to be advantageous to the player as compared with an ordinary gaming state.

When a win is determined through a BLUE 7 winning combination, a gaming status shifts from an ordinary gaming status to a second special gaming status called a normal big bonus. During the period of big bonus, the player can establish a small winning combination a maximum of 30 times, and can play a regular bonus game a maximum of three times. A normal big bonus game is more advantageous to the player as compared with a regular bonus game.

When a win is determined through a RED 7 winning combination, a gaming status shifts from an ordinary gaming status to a third gaming status called a super big bonus. The super big bonus differs from a normal big bonus in that a small winning combination is reported. As will be described later, in the slot machine 1A, when symbols that constitute a winning combination for which a win has been determined through internal lottery are aligned with any of the valid paylines L1 through L5, a win is determined. For this reason, if the player can ascertain a winning combination which has been determined through internal lottery, the player can acquire a larger number of tokens. Reporting of a small winning combination means that the kind of a winning combination which has been determined through internal lottery is reported to the player. Consequently, a super big bonus game is more advantageous to the player as compared with a normal big bonus.

Turning again to FIG. 1, disposed below the display windows 4*a*, 4*b*, and 4*c* is an operation section OP in which are arranged various types of operation members to be used by a player for playing games. The operation section OP has a token insertion slot 5, a start lever 6, a left reel stop button 7*a*, a center reel stop button 7*b*, a right reel stop button 7*c*, a credit button 8, and a BET button 15.

The token insertion slot 5 is provided below the display window 4*c* and enables insertion of tokens. When one token is inserted, the payline L1 becomes valid. When two tokens are inserted, the paylines L1 through L3 become valid. When three tokens are inserted, the paylines L1 through L5 become valid. Moreover, when the player inserts more than three tokens, the fourth token and subsequent tokens are saved as credits in the slot machine 1A.

The BET button 15 is disposed at a lower left position with respect to the display window 4*a*. The player uses the BET button 15 to specify the number of tokens to be bet in one game. By the player actuating the BET button 15, stored tokens can be bet without insertion of tokens by way of the token insertion slot 5. Therefore, the paylines L1 through L5 become valid, as required, by actuation of the BET button 15 in accordance with the specified number of tokens. The relationship between the number of tokens specified by actuation of the BET button 15 and the paylines L1 through L5 to become valid is identical with that determined in a case where tokens are inserted directly.

The start lever 6 is disposed below the BET button 15. The start lever 6 is used by the player to instruct start of a game. When the player lowers the start lever 6, the reels R1, R2, and R3 start spinning simultaneously, thereby variably displaying symbols within the respective display windows 4*a*, 4*b*, and 4*c*.

The left reel stop button 7*a*, the center reel stop button 7*b*, and the right reel stop button 7*c* are provided on the right side of the start lever 6. The left reel stop button 7*a* is used for stopping the left reel R1 spinning within the display window 4*a*; the center reel stop button 7*b* is used for stopping the center reel R2 spinning within the display window 4*b*; and the right reel stop button 7*c* is used for stopping the right reel R3 spinning within the display window 4*c*.

A credit button 8 to be used for determining whether to store tokens within the slot machine 1A is provided on the right side of the reel stop button 7*c*. When the player actuates the credit button 8, a change between validation of credits or invalidation of credits is enabled. In a predetermined case, tokens are paid to the player by way of a token payout port 10*a* and stored in a token receiver 10.

Figure 5:
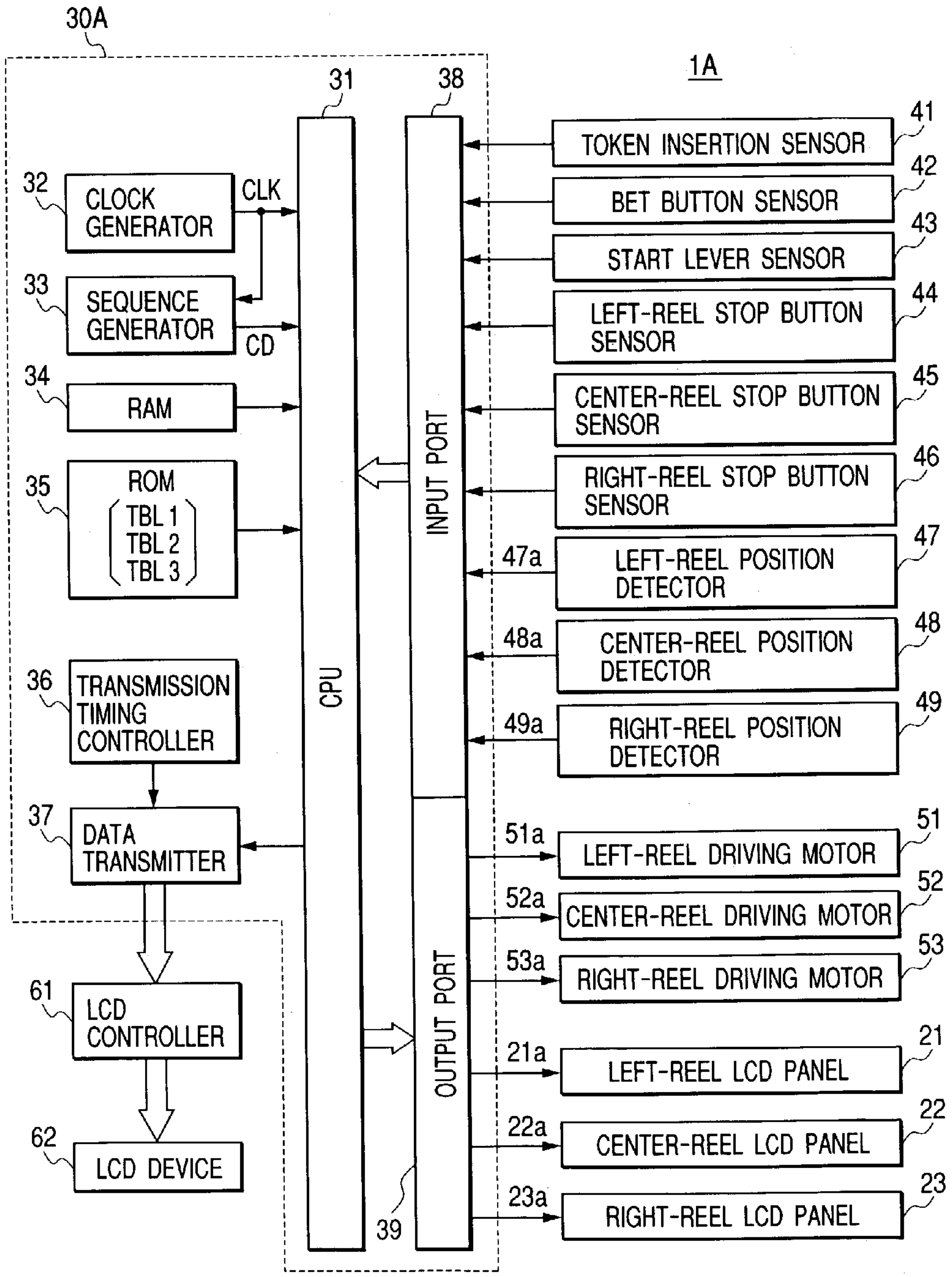
FIG. 5 is a block diagram showing the electrical configuration of the slot machine.

FIG. 5 shows a circuit configuration including a controller for controlling game processing operation in the slot machine 1A, and a peripheral device which constitutes the slot machine 1A and is relevant to the invention.

The controller includes a control board 30 as a primary constituent element. The control board 30 has a CPU 31, a clock generator 32, a sequence generator 33, RAM 34, ROM 35, a transmission timing controller 36, a data transmitter 37, an input port 38, and an output port 39.

The CPU 31 is connected to constituent elements of the control board 30 excluding the transmission timing generator 36, by way of a bus (not shown). The CPU 31 controls respective constituent elements by executing a control program CP. A manner of activating the overall slot machine 1A is specified in the control program CP. Therefore, the CPU 31 serves as a control center of the slot machine 1A. The clock generator 32 has an oscillation circuit including a quartz generator, generates a reference clock signal CLK of fixed cycle, and supplies the reference clock signal to the CPU 31 and the sequence generator 33.

The sequence generator 33 is constituted of a high-speed ring counter and produces count data CD by counting the reference clock signal CLK Depending on contents of a prize group selection table TBL1 to be described later, the numerical values of the count data CD assume a range of, e.g., 1 to 60000. The count data CD are supplied to the CPU 31 at all times. The CPU 31 senses a timing at which the start lever 6 is pressed by the player. The count data CD are sampled at that timing, thereby producing sampling data SD.

Since the player cannot ascertain the value of the count data CD, the timing at which the player lowers the start lever 6 is random. Consequently, the value of the sampling data SD is also random. The sequence generator 33 operates in synchronism with the reference dock signal CLK. Hence, the cycle of the count data CD is very short. For example, provided that the reference clock signal CLK has a cycle of 30 MHz, a time required for the value of the count data to change from "0" or to "59999" is 2 msec. Consequently, even if the player can ascertain the value of the count data CD by unauthorized means, the player cannot cause the CPU 31 to produce the sampling data SD having a desired value by actuation of the start lever 6.

Next, the RAM 34 serves as a work area of the CPU 31 and stores a result of processing currently in progress or data or the like prepared as required.

In addition to the control program CP, a prize group lottery table TBL1, a stop table group TBL2, and a winning symbol combination table TBL3 are stored in the ROM 35. Stored in the winning symbol combination table TBL3 in an associated manner are combinations of symbols that would constitute a winning combination; the numbers of tokens to be paid at the time the winning combinations arise; and a win determination code representing the winning combination.

As mentioned above, the winning combinations prepared in the slot machine 1A according to the embodiment include a RED 7 winning combination, a BLUE 7 winning combination, a BAR winning combination, a BELL winning combination, a WATERMELON winning combination, a CHERRY winning combination, and a PLUM winning combination. Establishment of the RED 7 winning combination serves as the impetus for shifting a gaming status to a super big bonus. Establishment of the BLUE 7 winning combination serves as the impetus for shifting a gaming status to a normal big bonus. Establishment of the BAR winning combination serves as the impetus for shifting a gaming status to a regular bonus.

The gaming values which the player can acquire differ from one kind of small winning combination to another. A control operation corresponding to a difference in gaming values is required for controlling the slot machine 1A. Classification of types of winning combinations according to gaming values is convenient. In the following description, an aggregate of various winning combinations is called a prize group.

As mentioned above, the RED 7 winning combination (super big bonus) and the BLUE 7 winning combination (normal big bonus) are identical with each other in terms of progress in a series of games, exclusive of report of a small winning combination. In the slot machine 1A of the embodiment, one prize group is assigned to these winning combinations. A prize group including the RED 7 winning combination and the BLUE 7 winning combination is called a big bonus prize. For the remaining winning combinations, prize groups are prepared so as to correspond to respective winning combinations. A prize group corresponding to the BAR winning,combination is called an regular bonus prize; a prize group corresponding to the BELL winning combination is called a BELL prize; a prize group corresponding to the WATERMELON winning combination is called a WATERMELON prize; a prize group corresponding to the CHERRY winning combination is called a CHERRY prize; and a prize group corresponding to the PLUM winning combination is called a REPLAY GAME prize.

Figure 7:
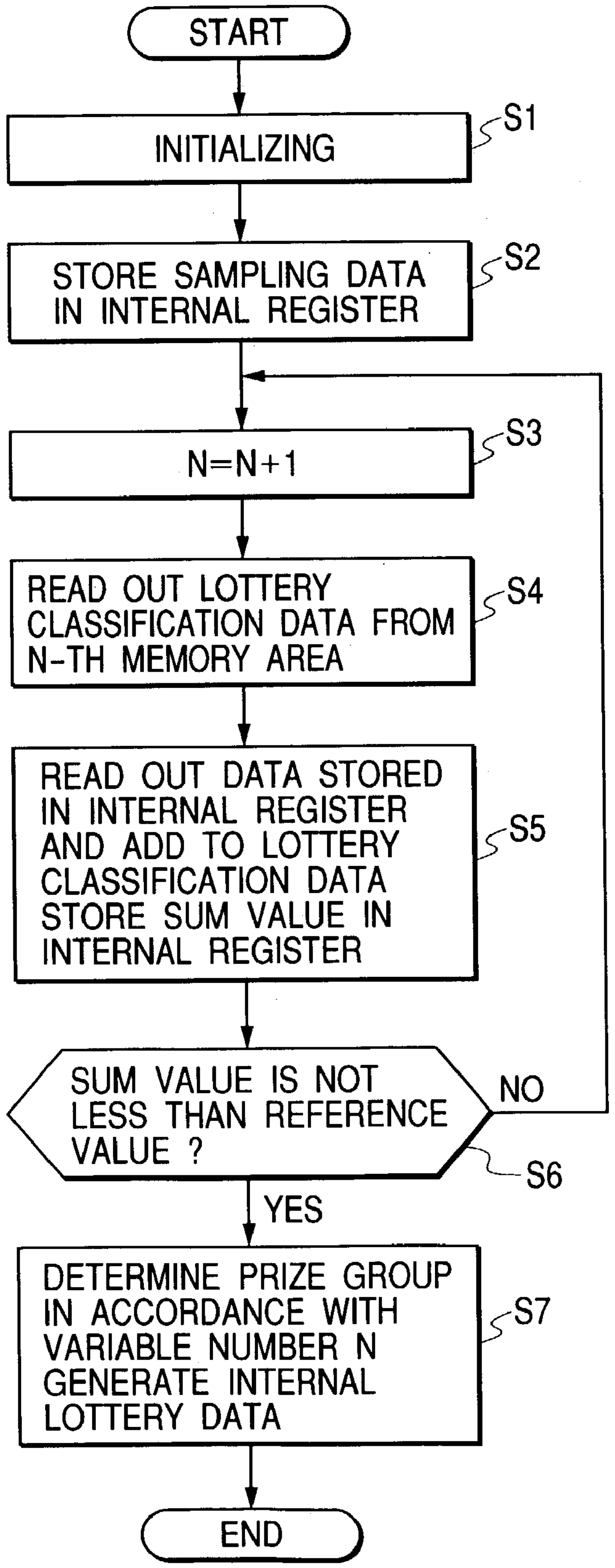
FIG. 7 is a flowchart showing operation of a CPU during internal lottery operation.

FIG. 7 is a flowchart showing operation of the CPU 31 to be performed during an internal lottery operation through use of the prize group sampling table TBL1. First, the CPU 31 performs an initializing (step S1). More specifically, the value of a variable number N is reset to "0," and the value stored in the internal register is reset to "0."

Next, the CPU 31 stores first sampled data SD into an internal register (step S2). Subsequently, the value of the variable number N is changed to (N+1) (step S3). Next, the CPU 31 reads lottery classification date from an n-th memory area (step S4). By processing to be performed immediately after initializing, the value of the variable number is set to "1." The lottery classification data are read from a first memory area ADR1. In this case, the data assume a value of "54000."

Next, the CPU 31 reads contents stored in the internal register and adds the thus-read data to the lottery classification data. The resultant sum value is stored in the internal register (step S5). Consequently, the contents of the internal register are updated to the resultant value.

Net, the CPU 31 determines whether the sum value is not less than a reference value (step S6). The reference value is equal to an aggregate of the respective lottery classification data values stored in the first through seventh memory areas ADR1 to ADR7.

Figure 6:
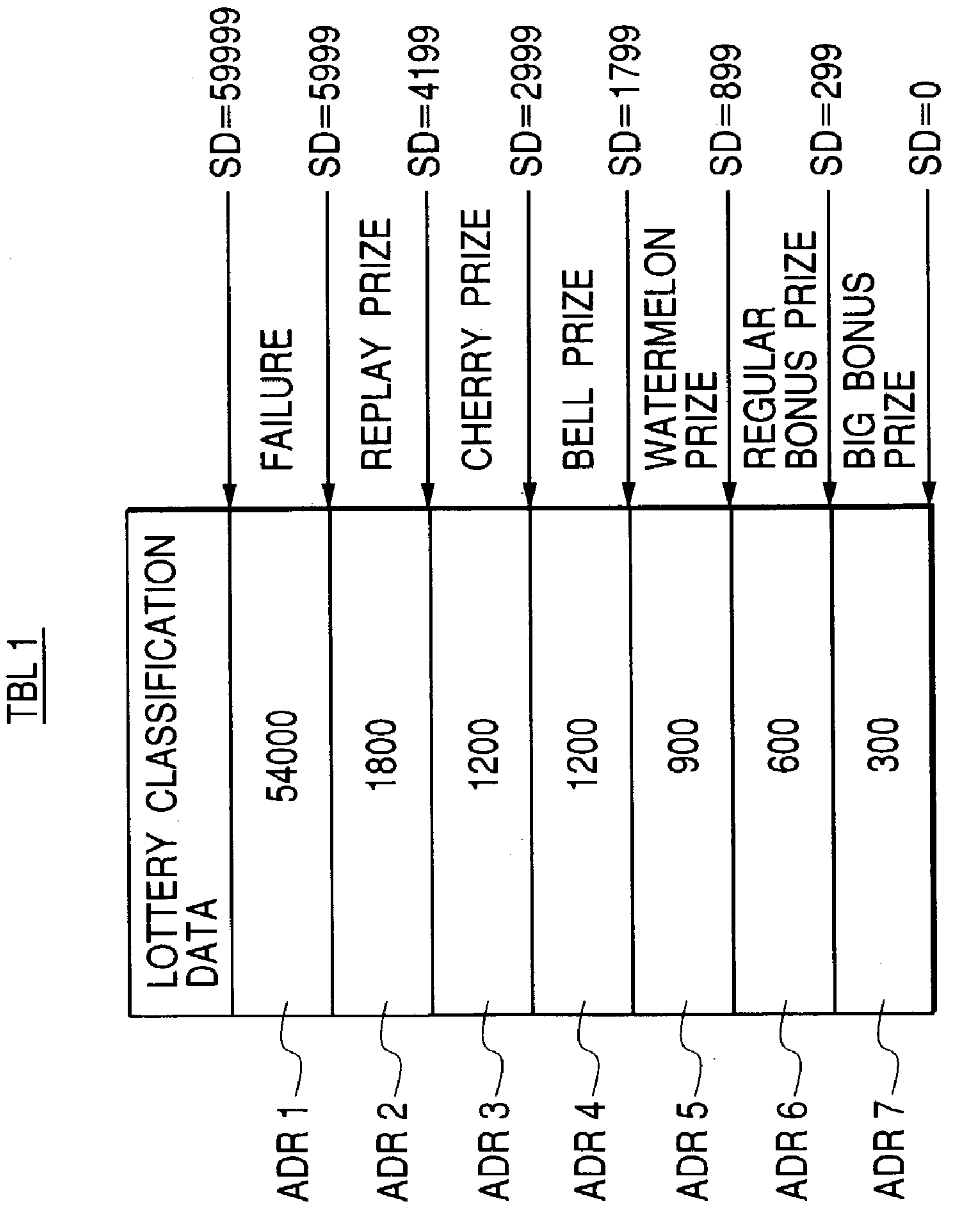
FIG. 6 is a descriptive view showing an example of contents stored in a prize group sampling table.

If the sum value is less than the reference value, the CPU 31 returns processing to step S3 and repeats processing pertaining to steps S3 to S6 until the sum value becomes greater than the reference value. At this point, the CPU 31 proceeds processing to step S7. A prize group is determined in accordance with the value of the variable number N, thereby generating internal lottery data. More specifically, when N=1, a failure is determined. When N=2, a REPLAY prize is determined. When N=3, a CHERRY prize is determined. When N=4, a BELL prize is determined. When N=5, a WATERMELON prize is determined. When N=6, an RB prize is determined. When N=7, a BB prize is determined. Consequently, a relationship between the first sampled data SD and the prize groups is as shown in FIG. 6. As illustrated, SD=59999 to 6000 corresponds to a failure; SD=5999 to 4200 corresponds to a REPLAY prize; SD=4199 to 3000 corresponds to a CHERRY prize; SD=2999 to 1800 corresponds to a BELL prize; SD=1799 to 900 corresponds to a WATERMELON prize; SD=899 to 300 corresponds to an RB prize; and SD=299 to 0 corresponds to a BB prize.

The CPU 31 produces internal lottery data ISD on the basis of a result of determination. The internal lottery data ISD are 8-bit data. A first bit is allocated to a big bonus prize; a second bit is allocated to an regular bonus prize; a third bit is allocated to a BELL prize; a fourth bit is allocated to a WATERMELON prize; a fifth bit is allocated to a CHERRY prize; and a sixth bit is allocated to a REPLAY prize. If a win has been determined for any one of the prizes through internal random sampling, the CPU 31 sets the digit of a corresponding bit to "1." When no win has been determined, the digit of a bit is set to "0." Consequently, it is possible to ascertain whether or not a win has been determined or a prize group for which a win has been determined, by referring to the internal status data ISD.

Next, the stop table group TBL2 is constituted of a plurality of stop tables. In the respective stop tables, symbol numbers PN to be displayed on the center payline L1 and data pertaining to the number of frames over which reels coast (hereinafter simply called "coasting frame data") are stored in association with each other. Here, the number of frames over which reels coast means the number of frames over which the left reel R1, the center reel R2, and the right reel R3 coast until they come to a halt from the time the player has pressed the left reel stop button 7*a,* the time the player has pressed the center reel stop button 7*b,* and the time the player has pressed the right reel stop button 7*c,* respectively.

Since the left reel R1, the center reel R2, and the right reel R3 spin at high speed, even when the player has actuated the stop buttons while aiming at specific symbols, the player is required to have a skill for stopping the reels such that desired symbols are stopped. Learning of actuation of stop buttons involves variations among individual players. Particularly, a player having a low level of kinetic vision encounters difficulty in stopping the reels such that desired symbols appear, in contrast, a player having a high level of kinetic vision can actuate the stop buttons when desired symbols are displayed along a payline.

However, in order to enable a player having a low level of kinetic vision to enjoy playing games, alignment of symbols must be made easy to a certain extent. In contrast, when the result of internal lottery is a failure, there is a necessity for controlling spinning of the reels such that no winning combination is established.

Figure 8:
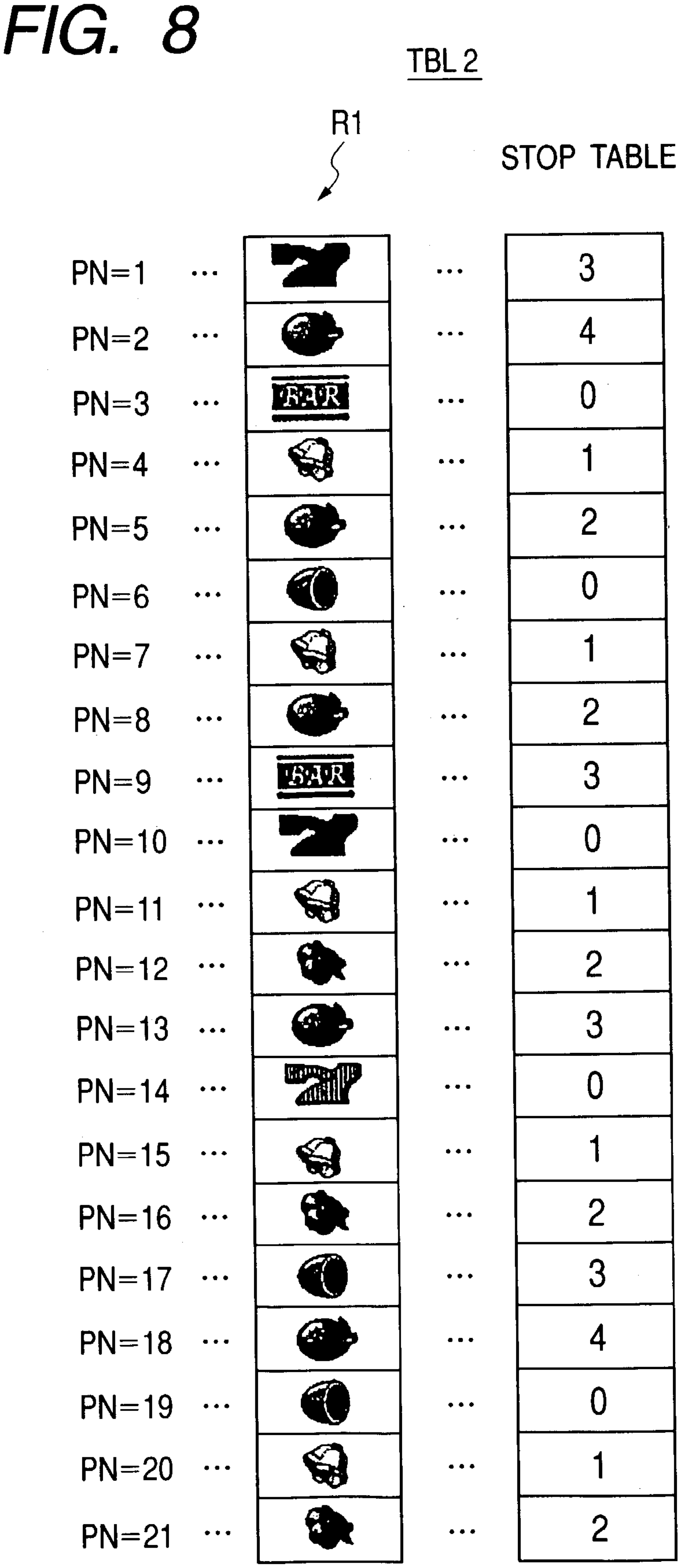
FIG. 8 is a descriptive view showing an example of a stop table.

The stop table is used for controlling such spinning actions of the reels. Positions at which the left reel R1, the center reel R2, and the left reel R3 are to be stopped are determined by reference to a stop table. FIG. 8 shows an example of the stop table. The stop table is for the left reel R1. The coasting frame data stored in the stop table are set such that symbols BELL are likely to be stopped at a lower payline L3. For example, a player is assumed to have pressed the left reel stop button 7*a* at a timing at which a symbol BAR specified by symbol number PN=9 is displayed along the center payline L1. In this case, when the stop table is referred to on the basis of the symbol number PN=9, there are selected coasting frame data in which the number of frames over which a reel coasts assumes three. Consequently, if spinning of the left reel R1 is controlled on the basis of the thus-selected coasting frame data, stopping of BELL symbols (symbol number PN=7) at the payline L3 will become possible.

Turning back to FIG. 5, description of the controller will be continued. The transmission timing controller 36 and the data transmitter 37 shown in the drawing play the role of transmitting, to the LCD controller 61, the kind of a winning combination determined through internal lottery and information about a stop table selected in association with the winning combination. The LCD controller 61 has a ROM in which various types of image data are stored. The LCD controller 61 reads image data, as required, and supplies the image data to the LCD device 62. The LCD device 62 displays various types of images on the basis of image data. For example, reporting of a small winning combination to be performed during the course of a super big bonus game is performed, by the CPU 31 transmitting internal status data ISD to the LCD controller 61 by way of the data transmitter 37; the LCD controller 61 reading image data corresponding to a winning combination instructed by the internal status data ISD from the ROM; and the thus-read image data being supplied to a LCD device.

The input port 38 is an input interface for signals supplied from various types of sensors to be described later. The output port 39 is an output interface for supplying a control signal to motors and various devices.

The following are enumerated as primary input signal generators which are connected to the input port 38 and generate various types of input signals. An token insertion sensor 41 senses tokens inserted by way of the token insertion slot 5 and produces one output pulse for each token. Consequently, the CPU 31 can sense the number of inserted tokens by counting the output pulses.

A BET button sensor 42 senses actuation of the BET button 15. A start lever sensor 43 senses actuation of the start lever 6. A left reel stop button sensor 44 senses actuation of the left reel stop button 7*a;* a center reel stop button sensor 45 senses actuation of the center reel stop button 7*b;* and a right reel stop button sensor 46 senses actuation of the right reel stop button 7*c*. Further, a left reel position detector 47 senses the spinning position of the left reel R1 and produces a detection signal 47*a;* a center reel position detector 48 senses the spinning position of the center reel R2 and produces a detection signal 48*a;* and a right reel position detector 49 senses the spinning position of the center reel R2 and produces a detection signal 49*a*.

The right reel position detector 49 has the photocoupler 492 shown in FIG. 2, an amplifier, and a comparator. The photocoupler 492 has a light-emitting section and a light-receiving section. When the light-receiving section outputs a received light signal of a level corresponding to the quantity of received light, the amplifier amplifies the received light signal. The comparator compares the signal output from the amplifier with a predetermined threshold value, thereby producing the detection signal 49*a*. The signal is output as an output signal from the right reel position detector 49. When the right reel R1 spins, the shading piece 491 shown in FIG. 2 passes through the photocoupler 492 once during the course of one spin. Consequently, the spinning position of the right reel R3 can be sensed by the detection signal 49*a*. The left position detector reel 47 and the center position sensor reel 48 are constructed in the same manner as is the right reel position detector 49.

Primary members which are connected to the output port 39 and receive supply of various output signals include a left reel drive motor 51, a center reel drive motor 52, a right reel drive motor 53, a left reel liquid-crystal panel 21, a center reel liquid-crystal panel 22, and a right reel liquid-crystal panel 23.

The left reel driving motor 61 drives the left reel R1 so as to spin; the center reel driving motor 52 drives the center reel R2 so as to spin; and the right reel driving motor 53 drives the right reel R3 so as to spin. In the embodiment, the driving motors are constituted of stepping motors. Consequently, the CPU 31 can correctly determine a stop position for the left reel R1, that for the center reel R2, and that for the right reel R3 by adjusting the number of pulses of respective drive signals 51*a*, 52*a*, 53*a* to be supplied to the left reel driving motor 51, the center reel driving motor 52, and the right reel driving motor 53, respectively.

Each of the motors 51, 52, 53 is constructed so as to spin once in response to 420 pulses. As mentioned above, 21 symbols are formed on each of the reels R1, R2, and R3. One symbol can be advanced by supplying 20 pulses to the motor. The CPU 31 counts the number of pulses to be supplied to the motors 51, 52, and 53. Count results are retained as position data MD1, MD2, and MD3. Values of the position data MD1, MD2, and MD3 are reset at timings at which the detection signals 47*a*, 48*a*, and 49*a* become active.

Figure 9:
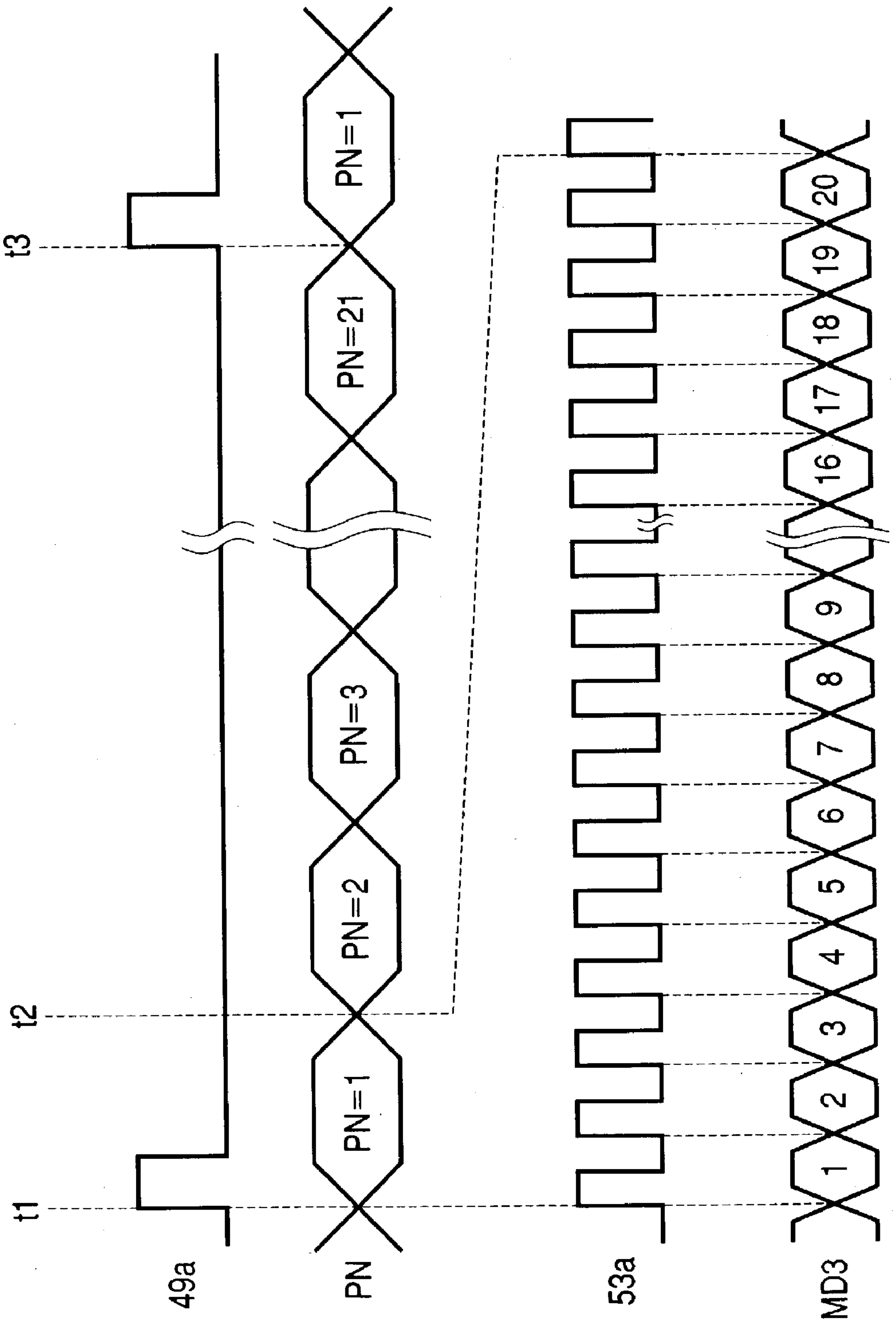
FIG. 9 is a timing chart showing a relationship between a detection signal, symbol numbers, a drive signal and position data.

FIG. 9 is a timing chart showing the relationship between the detection signal 49*a*, the symbol number PN, a drive signal 53*a*, and the position data MD3. As illustrated, when the detection signal 49*a* rises from a low level to a high level at time t1, the value of the position data MD3 is reset. At time t1, the shading piece 491 shown in FIG. 2 passes through the photocoupler 492. At this time, in relation to the spinning position of the right reel R3, the symbol assigned symbol number PN=1 (BELL) shown in FIG. 4 is displayed in a middle row of the display window 4*c*. In other words, attachment positions of the shading piece 491 and the photocoupler 492 are determined such that a symbol appears in the middle row of the display window 4*c*.

During a duration from time t1 to time t2, 20 pulses are supplied to the left reel drive motor 51 as a drive signal 53*a*, and the right reel drive motor 53 spins the right reel R3 one-twenty-first of a rotation. As a result, the symbol assigned symbol number PN=2 (PLUM) shown in FIG. 3 appears in the middle row of the display window 4*c*. Symbols are sequentially displayed in the same manner. When time t3 has come, the right reel R3 spins once, and the symbol assigned symbol number PN=1 (BELL) appears. In this way, the detection signal 49*a*, the symbol number PN, the drive signal 53*a*, and the position data MD3 are closely related to each other. The CPU 31 can detect a displayed state of a symbol on the basis of the position data MD3.

On the basis of the position data sets MD1 and MD2, the CPU 31 can sense a displayed state of a symbol on the left reel R1 and a displayed state of a symbol on the center reel R2.

A voltage signal 21*a* is supplied to the left reel liquid-crystal panel 21; a voltage signal 22*a* is supplied to the center reel liquid-crystal panel 22; and a voltage signal 23*a* is supplied to the right reel liquid-crystal panel 23. Voltages of the voltage signals 21*a*, 22*a*, and 23*a* are set to the voltage V at which liquid crystal become translucent. Consequently, when the voltage signals 21*a*, 22*a*, and 23*a* become active, the mask area MS (see FIG. 3) becomes translucent, and a symbol which is visible through the non-mask areas NM is highlighted.

Figure 10:
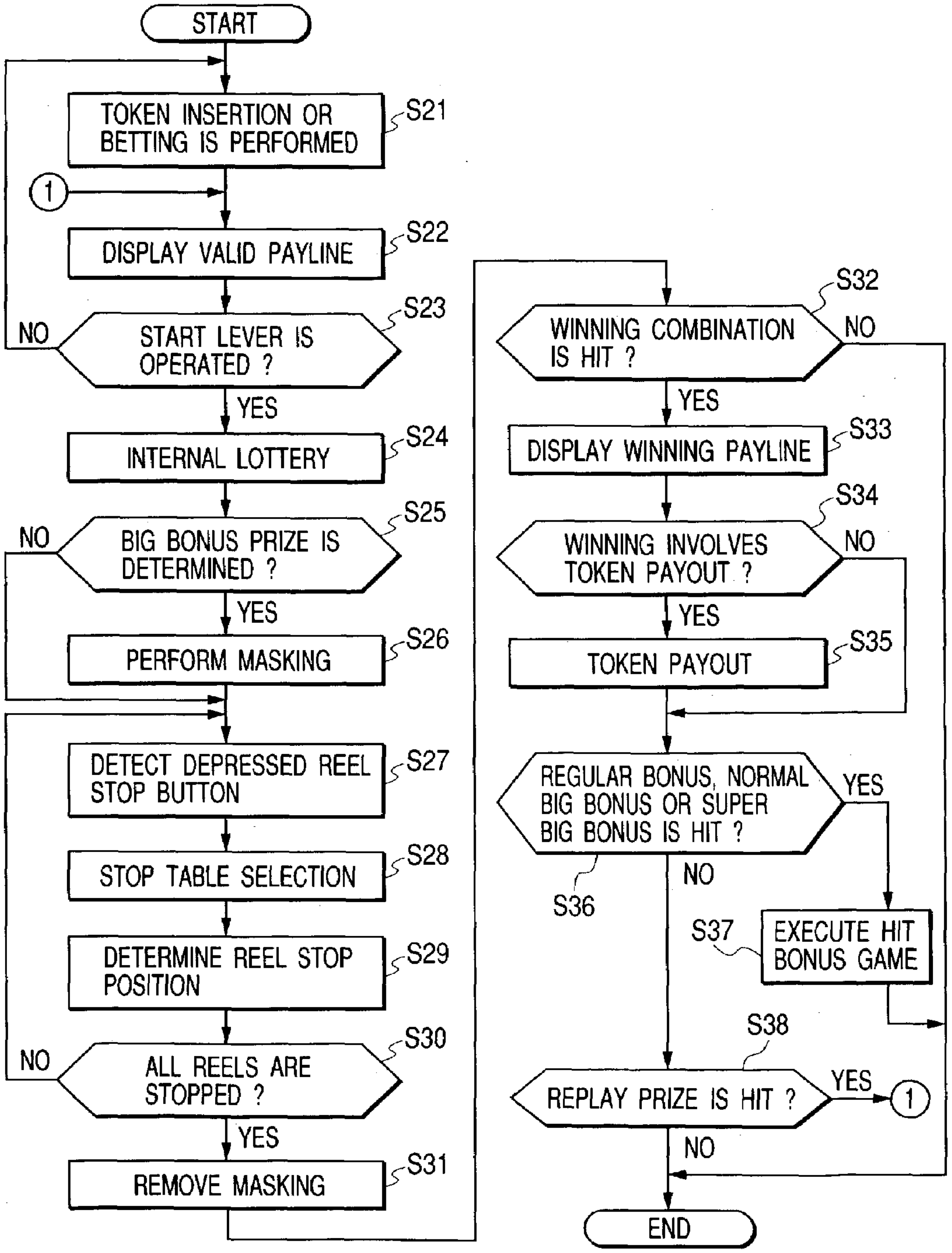
FIG. 10 is a flowchart showing operation of the slot machine to be performed when the CPU executes a control program.

Operation of the slot machine 1A will now be described. FIG. 10 is a flowchart showing the operation of the overall slot machine performed when the CPU 31 has executed the control program CP.

In accordance with a detection signal output from the inserted token detector 41 and that output from the BET button 42, the CPU 31 performs a bet receiving operation when the player inserts a token or performs a betting operation (step S21).

Subsequently, in accordance with the number of tokens inserted or bet by a betting operation, the. CPU 31 displays, on the auxiliary display section 20, validated paylines of the paylines L1 through L5 (step S22). As mentioned previously, the auxiliary display section 20 is constituted of five LEDs. When corresponding paylines of the paylines L1 through L5 are valid, the auxiliary display section 20 is illuminated. Hence, the player can ascertain valid paylines from among the paylines L1 through L5.

Subsequently, in accordance with a detection signal from the start lever sensor 43, the CPU 31 determines whether or not the player has validly actuated the start lever 6. Even if the player has actuated the start lever 6 without inserting or betting tokens, a result of determination performed in step S23 becomes NO. In this case, the CPU 31 repeats processing pertaining to steps S21 through S23.

When actuation of the start lever 6 is valid, a result of determination made in step S6 becomes "YES." The CPU 31 supplies the drive signal 51 a to the left reel drive motor 51 so as to start spinning of the left reel R1, supplies the drive signal 52*a* to the center reel drive motor 52 so as to start spinning of the center reel R2, and supplies the drive signal 53*a* to the right reel drive motor 53 so as to start spinning of the right reel R3. In accordance with the control program CP, the CPU 31 performs an internal lottery operation (step S24).

Internal lottery operation is performed in the following manner. First, the CPU 31 executes sampling of count data CD at a timing at which a detection signal output from the start lever sensor 43 has become active, to thereby acquire sampled data SD. Second, the CPU 31 generates internal selection data ISD by reference to the prize group sampling table TBL1 stored in the ROM 35. For instance, FIG. 4 shows contents stored in the prize group sampling table TBL1. When the value of the sampled data SD is assumed to have a value of "150," the internal lottery data SD represent a win for a BB prize.

When the internal lottery operation has been completed, the CPU 31 determines whether or not a win has been determined for a BB prize, on the basis of the internal lottery data ISD (step S25). Specifically, if the first bit of the internal lottery data IDS assumes a value of "1," the CPU 31 determines that a win has been determined for a BB prize. In contrast, if the first bit assumes a value of "0," the CPU 31 determines that a win is not determined for the BB prize.

Figure 11:
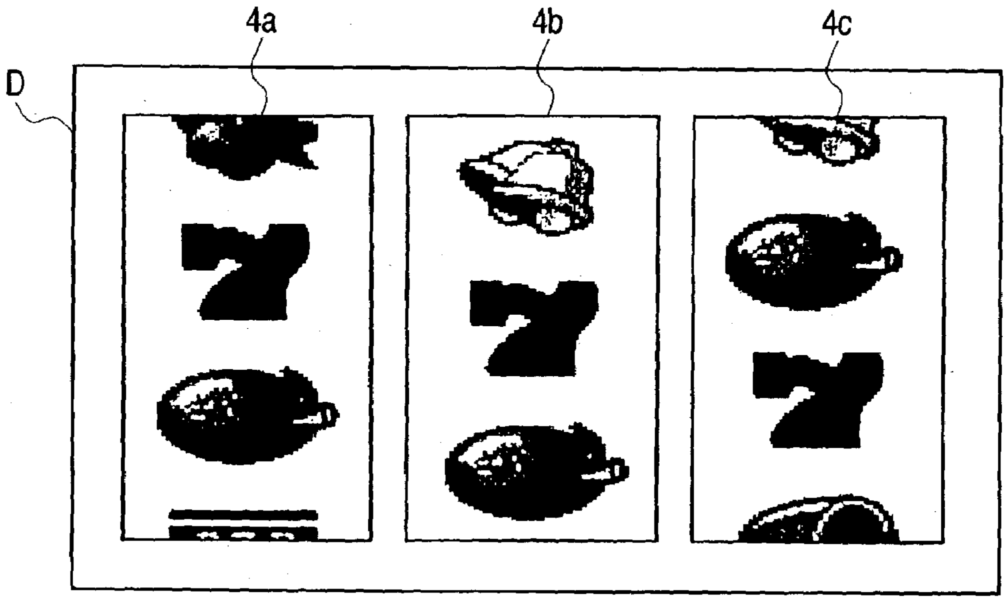
FIG. 11 is a descriptive view showing an example displayed state of a panel display section before a masking operation.
Figure 12:
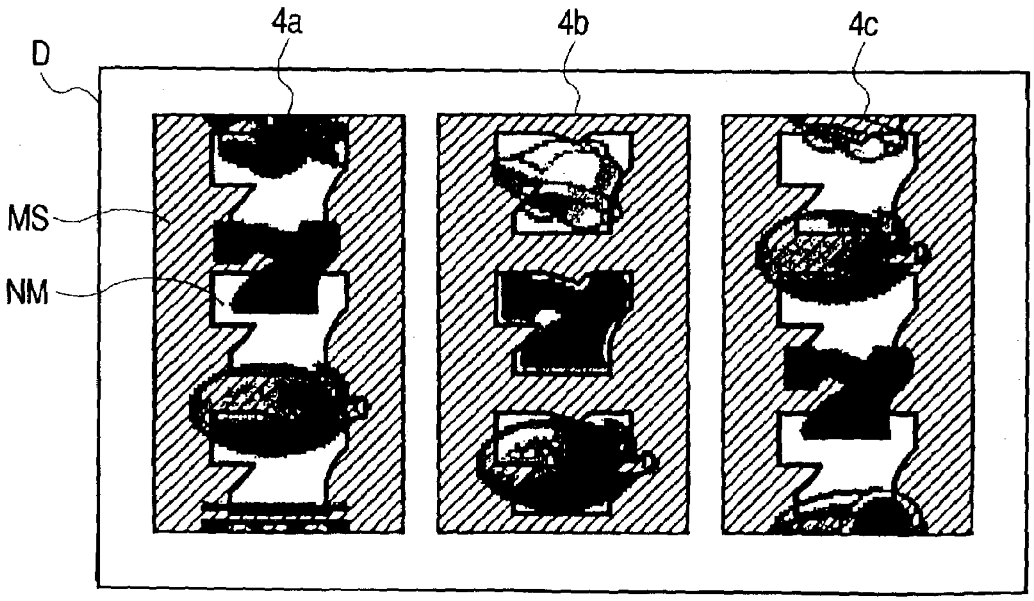
FIG. 12 is a descriptive view showing an example displayed state of a panel display section after the masking operation.

When a result of determination made in step S25 is "YES," the CPU 31 starts masking operation (step S26). During the masking operation, the CPU 31 makes the voltage signals 21*a,* 22*a,* and 23*a* active. As a result, the left reel liquid-crystal panel 21, the center reel liquid-crystal panel 22, and the right reel liquid crystal panel 23 become translucent. For instance, when the panel display section D before masking operation is presumed to assume a display state shown in FIG. 11, the panel display section D after masking operation assumes a display state shown in FIG. 12. Symbols in the respective non-mask areas NM are highlighted, whereas symbols in the mask areas MS become unnoticeable. In the embodiment shown in FIG. 12, a portion of the RED 7 symbol is visible through the non-mask area NM located In the middle row of the display window 4*a*. The entirety of the RED 7 symbol is visible by way of the non-mask area NM in the middle row of the display window 4*b*. A portion of the RED 7 symbol is visible by way of the non-mask area NM in the middle row of the display window 4*c*.

The advantage of masking operation is as follows. First, the masking operation is started when a win for the BB prize is determined through the internal lottery. Hence, the player can ascertain that a win has been determined for the BB prize, by glancing at the panel display section D. In other words, the player can be informed that a win has been determined for the BB prize. Further, this mode of report enables a reduction in a distance over which the line of sight of the player is to move, thereby diminishing eye fatigue on the part of the player.

Report of determination of a win for the BB prize has hitherto been performed by use of the liquid-crystal display device 62 attached to an upper section of the slot machine 1A. However, the player who is playing games stares at symbols appearing in the respective display windows 4*a,* 4*b,* and 4*c*. In contrast, in the present invention, the report of determination of a win for the BB prize is a report of conditions advantageous for the player to acquire a win. For this reason, the report attracts the player's attention, and the player shifts his/her line of sight to the liquid-crystal display device 62, thereby ascertaining whether or not a report has been issued. In the case of an impatient player, the player shifts his/her line of sight to the liquid-crystal display device 62 from the panel display section D for ascertaining a report for each game. In this way, frequent shift of line of sight places strain on the players eyes within a short period of time, thereby hindering the player from enjoying playing games for a long period of time.

In this regard, according to the embodiment, the mask areas MS and the non-mask areas NM appear in the panel display section D at which the player stares during the course of a game. Hence, the player does not need to move his/her eyes, hence, the player can enjoy playing games over a long period of time.

Second, if the masking operation is performed, the non-mask areas NM become translucent, whereby the geometries of the non-mask areas NM are highlighted. Since the geometries of the non-mask areas NM substantially coincide with the contours of specific symbols, even when the player does not know rules of a game in detail, the player can infer rules that a win is achieved when symbols matching in profile the non-mask areas NM ("7" in the embodiment) are stopped along the paylines L1 through L5. In other words, rules of the game can be communicated to a player intuitively without literal or linguistic descriptions of the rules. Further, the player infers rules during the course of progress in a game. Hence, the player can readily comprehend a game during a short period of time. Further, even a beginner who has no knowledge of rules can quickly enjoy playing games.

Third, when masking operation is performed, symbols in the non-mask areas NM are highlighted. In contrast, symbols in the mask areas MS become unnoticeable. At this time, the players interest lies in whether or not symbols whose contours coincide with the geometries of the non-mask areas NM can be stopped in the non-mask areas NM.

During the period of time in which the left reel R1, the center reel R2, and the right reel R3 are spinning, symbols sequentially pass through the non-mask areas NM. When specific RED 7 symbols or specific BLUE 7 symbols pass through the non-mask areas NM, the specific symbols momentarily become clear. When the masking operation is not performed, a highly-skilled player can stop specific symbols at the paylines L1 through L5, by actuating the reel stop buttons 7*a,* 7*b,* 7*c* at the moment the specific symbols pass through the paylines L1 through L5, whereas a beginner cannot determine symbols which are spinning and encounters difficulty in stopping specific symbols at the paylines L1 through L5.

When the masking operation is performed, specific symbols which pass through the non-mask areas NM are viewed clearly. Hence, even a beginner can stop specific symbols on the paylines L1 through L5. Consequently, a difference in level of skill among players is diminished, thereby enabling all players to enjoy playing games.

Fourth, a process in which specific symbols are stopped at non-mask areas NM is analogous to a case where specific pieces are fitted into predetermined holes or frames in a puzzle game. The player can feel satisfaction by completing an object by fitting specific symbols into the non-mask areas NM. In addition, stoppage of specific symbols in the non-mask areas NM coincides with winning requirements of rules of the game. Hence, a great feeling of enjoyment can be imparted to the player. At a point in time when a certain winning combination has not yet been established, a mask is formed by boring such that contours of symbols satisfying requirements for establishing a winning combination are arranged along paylines. As a result, the slot-machine 1A provides the same presentation as in a puzzle game, thereby augmenting the player's feeling when a win is achieved.

When a win for a BB prize has not been determined through internal lottery, the masking operation is not performed. Processing of the CPU proceeds to step S27. In step S27, the CPU 31 acquires a button number BN assigned to a currently-pressed reel stop button (step S27). Acquisition of a button number is performed in accordance with the following procedures. First, the CPU 31 assigns button numbers BN=1, BN=2, BN=3 to the left reel stop button 7*a,* the center reel stop button 7*b,* and the right reel stop button 7*c,* respectively. Second, the CPU 31 detects a pressed button in accordance with a detection signal output from the left reel stop button 44, a detection signal output from the center reel stop button 45, and a detection signal output from the right reel stop button 46. Third, the CPU 31 stores the button numbers BN corresponding to the detected buttons into a predetermined memory location of the RAM 34 specified by the control program CP.

Next, in accordance with the internal lottery data ISD and the button number BN, the CPU 31 selects one stop table from the stop table group TBL2 (step S28).

The CPU 31 determines stop positions of the reels by reference to the thus-selected stop table (step S29). In the processing for determining stop positions of the reels, the CPU 31 senses the timings at which the reel stop buttons 7*a*, 7*b*, 7*c* have been pressed, in accordance with the signals output from the reel stop button sensors 44 through 46, thereby acquiring symbol numbers PN assigned to the timings. The CPU 31 reads number-of-frames data by reference to the stop table in accordance with the symbol number PN, thereby controlling the reel drive motors 51 through 53 such that the reels spin by only the number of frames over which the reels are to coast, the number being instructed by the data. The reel drive motors 51 through 53 are constituted of stepping motors, and the CPU 31 imparts, to the reel drive motors 51 through 53, drive pulses in a number corresponding to the number of frames over which frames are to coast.

Subsequently, a determination is made as to whether or not all reels have stopped (step S30). Processing pertaining to steps S27 through S30 is repeated until all spinning reels come to a halt. When all reels have stopped, the CPU 31 processing proceeds to step S31. If masking operation is in progress, the masking operation is terminated. Specifically, the CPU 31 makes the voltage signals 21*a*, 22*a*, and 23*a* inactive.

Next, the CPU 31 determines whether or not a win has been achieved (step S32). If a win has been achieved, the payline where the win has been achieved is displayed (step S33).

Subsequently, the CPU 31 determines whether or not the win corresponds to a win involving payment of tokens (step S34). If the win corresponds to the win involving payout of tokens, the CPU 31 controls individual sections such that tokens are paid out in a number corresponding to the winning combination, by reference to the win determination symbol combination table TBL3 (step S35).

If the win does not correspond to payout of tokens, the CPU 31 omits processing pertaining to step S35 and advances processing to step S36, thereby determining whether or not there has been achieved a win corresponding to any one of the bonus games, such as a regular bonus, a normal big bonus, and a super big bonus, if the win corresponds to any one of the bonus games, the CPU 31 performs predetermined processing for advancing the bonus game (step S37). In contrast, if the win does not correspond to any bonus game, the CPU 31 determines whether or not the win is a REPLAY game (step S38). If the symbols that would constitute a winning combination are symbols which would constitute a PLUM winning combination, the CPU 31 returns processing to step S22. If the symbols are not symbols which would constitute a PLUM winning combination, a round of processing operations is terminated.

As has been described, the slot machine 1A performs masking operation. Consequently, the slot machine 1A can report to the player determination of a win for the BB prize. Further, the player does not need to shift his or her line of sight in order to ascertain a report. The geometries of the non-mask areas NM substantially coincide with the contours of specific symbols. Hence, even when the player does not know rules of a game in detail, the player can infer rules that a win is achieved in the slot machine 1A if symbols whose contours coincide with the geometries of the non-mask areas NM are stopped at the payline. Moreover, if masking operation is performed, specific symbols which pass through the non-mask areas NM become clearly visible. Hence, even a beginner can stop specific symbols at a payline. In addition, when specific symbols come to a halt in non-mask areas NM, a presentation effect is yielded, whereby the player is afforded a satisfaction of completing inset puzzles.

Figure 13:
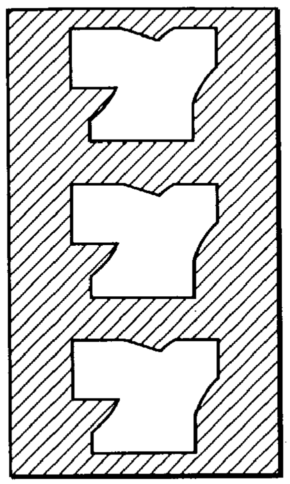
FIG. 13 is a plan view showing transparent electrodes used for a left reel liquid-crystal panel, a center reel liquid-crystal panel, and a right reel liquid-crystal panel.

In the first embodiment, contours of specific symbols are formed in the left reel liquid crystal panel 21, in the center reel liquid-crystal panel 22; and in the right reel liquid-crystal panel 23, by boring. In lieu of the left reel liquid-crystal panel 21, the center reel liquid-crystal panel 22, and the right reel liquid-crystal panel 23, liquid-crystal panels having no bored portions may be employed. In this case, as shown in FIG. 13, a transparent electrode to be formed on at least one of the first and second substrates may be a transparent electrode in which portions identical in shape with the non-mask areas NM are formed by boring. More specifically, the transparent electrode of the first substrate is imparted with the shape of a hatched section shown in FIG. 13, and a transparent electrode of the second substrate is formed into a rectangular shape. Alternatively, transparent electrodes of the first and second substrates are formed into the shape of the hatched section shown in FIG. 13.

When the voltage signals 21*a*, 22*a*, and 23*a* have become active, the voltage V is applied to the liquid-crystal corresponding to the mask areas MS, whereas the voltage V is not applied to the liquid-crystal corresponding to the non-mask areas NM. Consequently, only the liquid-crystal located in the mask areas MS can be made translucent.

In the first embodiment, contours of the specific symbols are formed in the left reel liquid-crystal panel 21, the center reel liquid-crystal panel 22, and the right reel liquid-crystal panel 23, by boring. Hence, the geometries of the non-mask areas NM and those of the mask areas MS are determined uniquely.

Alternatively, liquid-crystal panels having bored portions formed therein may be laminated to form a plurality of layers. In this case, the geometries of bored portions in the respective liquid-crystal panels may be substantially matched with the contours of the respective symbols, thereby selectively supplying a voltage to the liquid-crystal panels. The CPU 31 is required to perform masking operation in the following manner. First, in accordance with predetermined rules, the CPU 31 determines whether to perform masking operation. Second, when, the masking operation is determined to be performed, the CPU 31 specifies a winning combination corresponding to a prize group specified by the internal lottery data ISD. Third, the CPU 31 selects a liquid-crystal panel corresponding to symbols constituting a specified winning combination. The transparency of the overall thus-selected liquid-crystal panel is adjusted uniformly, thereby supplying a voltage so as to make the entire liquid-crystal panel translucent and terminating power supply to the remaining liquid-crystal panels, thus making the panels transparent. The masking operation may be performed when a win is determined for the BB prize through internal lottery and during a period of super big bonus. As a result, report of a small winning combination having been determined during a super big bonus can be performed through use of the liquid-crystal panel assuming a shape similar to that of the mask area MS.

A plurality of liquid-crystal panels described in connection with FIG. 13 may be laminated to form a plurality of layers. Alternatively, a liquid-crystal panel having bored portions and another liquid-crystal panel having a transparent electrode, a bored portion being formed in the electrode, may be combined together, as required.

A slot machine 1B according to a second embodiment of the invention will now be described. The slot machine 1B of the second embodiment is identical in mechanical constitution with the slot machine 1A of the first embodiment shown in FIG. 1, except that a single liquid-crystal panel 80 is used in place of provision of the left reel liquid-crystal panel 21 in the display window 4*a,* provision of the center reel liquid-crystal panel 22 in the display window 4*b,* and provision of the right reel liquid-crystal panel 23 in the display window 4*c*.

Figure 14:
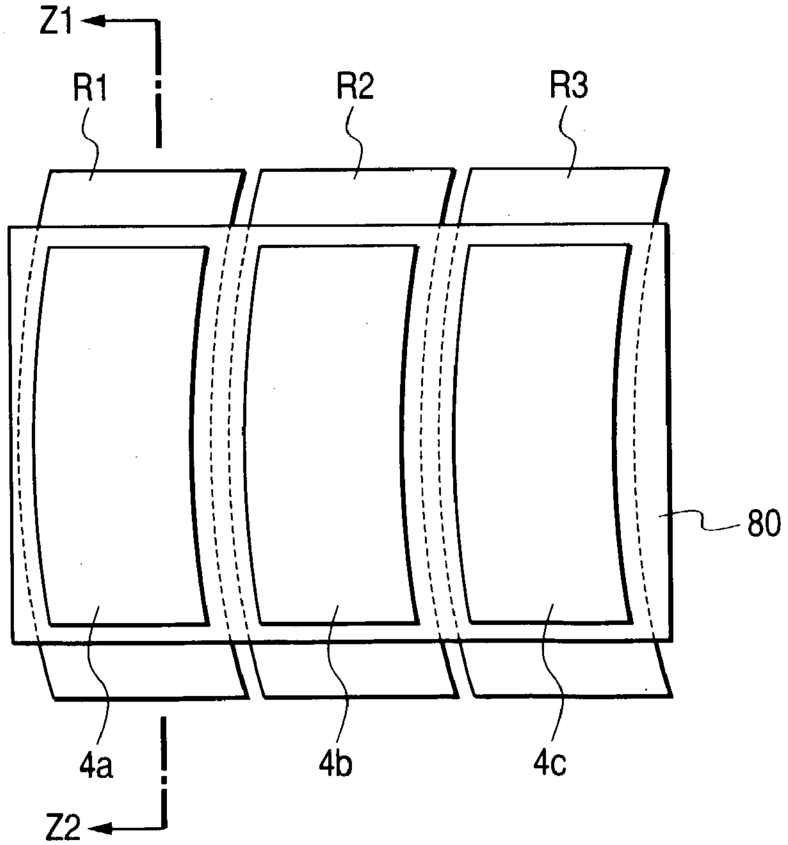
FIG. 14 is a descriptive view schematically showing mechanical constitution of the panel display section in a slot machine according to a second embodiment of the invention.
Figure 15:
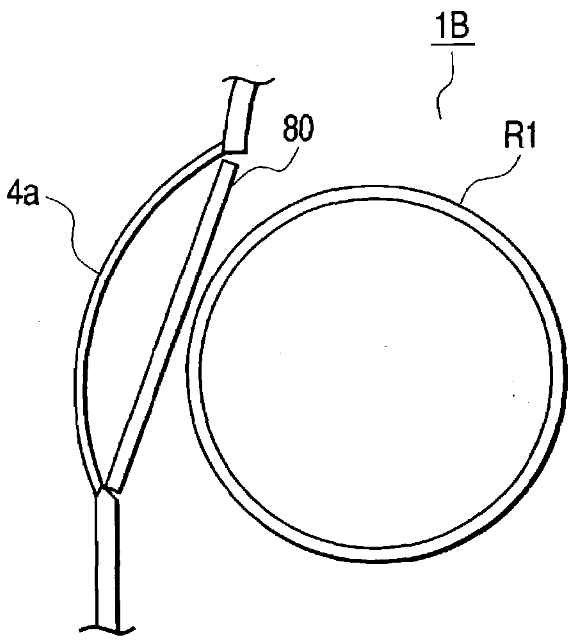
FIG. 15 is a cross-sectional view of the panel display section shown in FIG. 14 taken along a line Z1-Z2.

FIG. 14 is a descriptive view schematically showing mechanical constitution of a panel display section D in the slot machine 1B and FIG. 15 is a cross-sectional view of the panel display section D shown in FIG. 14 taken along line Z1-Z2.

As illustrated, the liquid-crystal panel 80 assumes a flat shape and is interposed between the display window 4*a* and the left reel R1, between the display window 4*b* and the center reel R2, and between the display window 4*c* and the right reel R3. The edge of the liquid-crystal panel 80 is fastened to the front door 3 (see FIG. 1). The liquid-crystal panel 80 is constructed such that liquid-crystal is sandwiched between the first and second substrates. Here, the liquid-crystal panel 80 differs from the left reel liquid-crystal panel 21, the center reel liquid-crystal panel 22, and the right reel liquid-crystal panel 23 in that a plurality of pixels are arranged in a matrix pattern and that glass is used for the first and second substrates. Specifically, the liquid-crystal panel 80 cannot be flexed, but various mask images can be displayed thereon. A general-purpose liquid-crystal panel can be used for this liquid-crystal panel. A mask image has transparent non-mask areas NM and a translucent mask area MS The non-mask areas NM are arranged so as to be situated at positions on the paylines L1 through L5.

Figure 16:
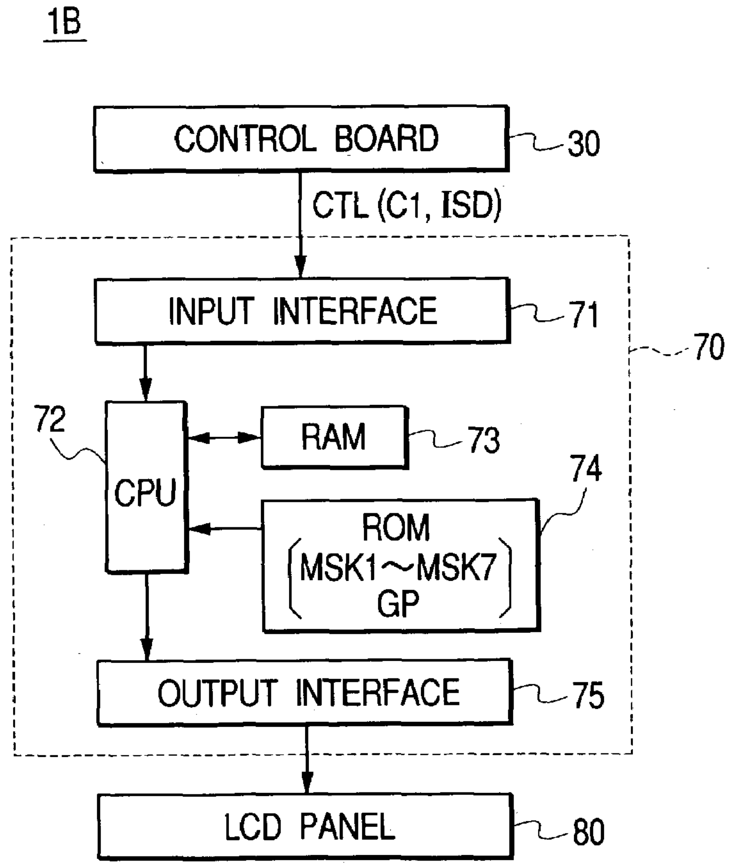
FIG. 16 is a block diagram showing the electrical configuration of principal section of the slot machine shown in FIG. 14.

FIG. 16 is a block diagram showing electrical configuration of the principal section of the slot machine 1B. As illustrated, the slot machine 1B has a control board 30B, a display controller 70, and a liquid-crystal panel 80.

The control board 30B is identical with the control board 30A shown in FIG. 5, except that the board outputs a control signal CTL to the display controller 70 and does not output the voltage signals 21*a,* 22*a*, and 23*a*. Although omitted from FIG. 16, the control board 30B is identical with the control board 30A of the first embodiment in that various types of sensors and motors are connected thereto.

The control signal CTL includes a display command C1 and the internal lottery data ISD. The display command C1 instructs execution of masking operation. In the following situation, the CPU 31 on the control board 30B generates a display command C1 in accordance with the control program CP. More specifically, the display command C1 is generated as a result of a win having been determined for the BB prize by the internal lottery data ISD, during a period before a win is determined for the BB prize, and during a period of super big bonus.

Next, the display controller 70 comprises an input interface 71, a CPU 72, RAM 73, ROM 74, and an output interface 75. The CPU 72 serves as a control center for controlling the overall display controller 70. The RAM 73 serves as a work area of the CPU 72.

In addition to the display control program GP, mask data MSK1 through MSK7 are stored in the ROM 74. The mask data MSK1 through MSK7 are used for displaying the mask area MS and the non-mask areas NM. The geometry of a boundary between a non-mask area NM and a mask area MS changes according to the mask data sets MSK1 through MSK7. A non-mask area NM of the mask data MSK1 corresponds to a contour of the "RED 7" symbol and a contour of the "BLUE 7" symbol. A non-mask area NM of the mask data MSK2 corresponds to the contour of the "BELL" symbol. A non-mask area NM of the mask data MSK3 corresponds to the contour of the "WATERMELON" symbol. A non-mask area NM of the mask data MSK4 corresponds to the contour of the "CHERRY" symbol. A non-mask area NM of the mask data MSK5 corresponds to the contour of the "PLUM" symbol. Each of the mask data sets MSK1 through MSK7 is a data set of bit map format. One bit is assigned to one pixel. A mask area MS is specified by a data value of "1." A non-mask area NM is specified by a data value of "0."

In accordance with the control signal CTL, the CPU 72 displays a mask image on the liquid-crystal panel 80 at a predetermined timing. More specifically, the CPU 72 determines whether or not the control signal CTL includes a display command C1. If the display command C1 is included, the mask image is displayed on the liquid-crystal panel 80. Moreover, when a mask image is displayed, the CPU 72 specifies a symbol corresponding to a prize group for which a win has been determined, on the basis of the internal lottery data ISD included in the control signal CTL. The mask data MSK1 through MSK7 corresponding to the specified symbols are read from the ROM 74. On the basis of the thus-read mask data MSK1 through MSK7, the CPU 72 displays a mask image on the liquid-crystal panel 80.

Consequently, during a period in which a win has been determined for the BB prize by internal lottery data ISD and before a period in which a win has been determined for the BB prize, the geometries of the non-mask areas NM substantially coincide with the contour of the "7" symbol, as in the case of the first embodiment. Further, during a period of super big bonus, the geometries of the non-mask areas NM substantially coincide with the contours of the symbols that would constitute the winning combination selected by internal lottery.

A conventional report to be performed during a super big bonus game is for reporting to the player the kind of small winning combination for which a win has been determined. Even when having ascertained the type of a small winning combination, a less-skilled player cannot distinguish symbols to be displayed on spinning reels R1 through R3. Therefore, the player encounters difficulty in stopping desired symbols at the paylines L1 through L5. However, according to the embodiment, the non-mask areas NM corresponding to the winning combination for which a win has been determined are displayed along the paylines L1 through L5. Hence, even a less-skilled player can readily know timings at which desired symbols pass through the paylines L1 through L5, thereby enabling alignment of desired symbols. Consequently, according to the embodiment, the number of tokens acquired by the player during a period of super big bonus can be made uniform without regard to a difference between levels of skill of players.

The invention has been described in association with embodiments which are considered to be most practical and preferable at this point in time. However, the invention is not limited to the embodiment described in the specification and is susceptible to modifications, as required, that fall within the scope of the gist or concept of the invention read from claims and the entire specification. A slot machine involving such modifications must be construed to fall within the technical scope of the invention. For instance, as a matter of course, modifications provided below fall within the scope of the invention.

In the embodiment, the invention has been described by taking, as an example of an electro-optical panel, the left reel liquid-crystal panel 21, the center reel liquid-crystal panel 22, the right reel liquid-crystal panel 23, and the liquid-crystal panel 80, all using an electro-optical substance. As a matter of course, the invention is not limited to the embodiment. The invention is characterized in that the non-mask areas NM whose shapes coincide with a contour of a specific symbol are arranged at the paylines L1 through L5 under predetermined conditions. Hence, any panel may be employed, so long as the optical transparency of the panel can be adjusted. As a matter of course, any electro-optical substance may be used, so long as the substance changes in transparency in accordance with a voltage or a current. For example, an organic electro luminescence panel may be employed.

The first and second substrates constituting the liquid-crystal panel 80 of the second embodiment are made of glass. As in the case of the first embodiment, the boards may be formed from plastic. In short, any material can be employed, so long as a plurality of types of mask images can be displayed.

In the second embodiment, a mask image is displayed on the liquid-crystal panel 80 during a period of super big bonus. However, the mask image may be displayed at a certain probability. In this case, the CPU 31 performs an internal lottery operation. On the basis of a result of the internal lottery operation, a determination is made as to whether or not a mask image is to be displayed. When a mask image is to be displayed, a display command C1 is generated. In contrast, when no mask image is to be displayed, the display command C1 is not produced.

As has been described, a slot machine of the invention enables a player to be clearly informed of rules of a game and enables a less-skilled player to enjoy playing games.

What is claimed is:

1. A slot machine, comprising:

a plurality of reels, each provided with a plurality of symbols including at least one special symbol having a contour;

at least one payline, extending across the reels;

at least one electro-optical panel, including a first transparent substrate and a second transparent substrate, each of which is formed with at least one opening having a shape substantially coincident with a contour of at least one special symbol, the electro-optical panel disposed in front of each of the reels such that the at least one opening is placed on the payline, said electro-optical panel further including an electro-optical substance, sandwiched between the first transparent substrate and the second transparent substrate at a part which is other than the opening; and a controller, which controls a state of the electro-optical substance in accordance with a predetermined rule to adjust a transparency of the electro-optical panel in order to vary viewability of symbols on the reels.

2. The slot machine as set forth in claim 1, wherein the reels are physical reels.

3. The slot machine as set forth in claim 1, wherein the electro-optical panel is disposed separately from the reels.

4. The slot machine as set forth in claim 1, wherein the electro-optical panel is an organic electro luminescence panel.

5. The slot machine as set forth in claim 1, further comprising:

a main body, which houses the reels therein; and a door, attached to the main body, the door formed with a transparent window through which a player is able to see the reels, wherein the electro-optical panel disposed along an inner face of the transparent window.

6. The slot machine as set forth in claim 1, further comprising a random number selector, which determines one of a plurality of lottery results including at least one special lottery result corresponding to the special symbol, to generate internal information indicating the determined one of the lottery results, wherein the controller makes the electro-optical panel translucent when the internal information indicates that the determined one of the lottery results is the special lottery result.

7. The slot machine as set forth in claim 1, further comprising a random number selector, which determines one of a plurality of lottery results including a plurality of special lottery results corresponding to a plurality of special symbols, to generate internal information indicating the determined one of the lottery results, wherein:

a plurality of electro-optical panels are provided in association with the plurality of special symbols;

the controller makes one of the electro-optical panels associated with one of the special symbols translucent when the internal information indicates that the determined one of the lottery results is one of the special lottery results corresponding to the one of the special symbols, while the controller makes the other electro-optical panels transparent.

8. The slot machine as set forth in claim 1, wherein the controller shifts a gaming status of the slot machine from a first, basic gaming status to a second gaming status which provides higher gaming value than the first gaming status, when a predetermined combination of the symbols including the special symbol are aligned on the payline.

9. The slot machine as set forth in claim 1, wherein the electro-optical panel is a liquid crystal panel.

10. A slot machine, comprising:

a plurality of reels, each provided with a plurality of symbols including at least one special symbol having a contour;

at least one payline, extending across the reels;

an electro-optical panel, including a first transparent substrate and a second transparent substrate, the electro-optical panel disposed so as to cover at least one of the reels, said electro-optical panel further including an electro-optical substance sandwiched between the first transparent substrate and the second transparent substrate; and a controller, which controls a display of at least one mask image on the electro-optical panel in accordance with a predetermined rule, the mask image including a mask area and at least one non-mask area (1) having a shape substantially coincident with a contour of the special symbol, and (2) having a transparency higher than a transparency of the mask area in order to vary viewability of symbols on the reels, the mask image displayed such that the non-mask area is placed on the payline.

11. The slot machine as set forth in claim 10, wherein the electro-optical panel is disposed separately from the reels.

12. The slot machine as set forth in claim 10, further comprising:

a main body, which houses the reels therein; and a door, attached to the main body, the door formed with a transparent window through which a player is able to see the reels, wherein the electro-optical panel disposed along an inner face of the transparent window.

13. The slot machine as set forth in claim 10, wherein the controller shifts a gaming status of the slot machine from a first, basic gaming status to a second gaming status which provides higher gaming value than the first gaming status, when a predetermined combination of the symbols including the special symbol are aligned on the payline.

14. The slot machine as set forth in claim 10, wherein at least one of transparent electrodes formed on opposing faces of the first transparent substrate and the second transparent substrate has a shape substantially coincident with the non-mask area.

15. The slot machine as set forth in claim 10, wherein the electro-optical panel including a plurality of pixels arranged in a matrix manner, so that a transparency of each of the pixels is adjustable.

16. The slot machine as set forth in claim 10, further comprising a random number selector, which determines one of a plurality of lottery results including at least one special lottery result corresponding to the special symbol, to generate internal information indicating the determined one of the lottery results, wherein the controller displays the mask image on the electro-optical panel when the internal information indicates that the determined one of the lottery results is the special lottery result.

17. The slot machine as set forth in claim 10, further comprising a storage which stores at least one mask data adapted to display the at least one mask image, wherein the controller reads out the mask data in the storage to display the mask image on the electro-optical panel.

18. The slot machine as set forth in claim 17, further comprising a random number selector, which determines one of a plurality of lottery results including a plurality of special lottery results corresponding to a plurality of special symbols, to generate internal information indicating the determined one of the lottery results, wherein the controller reads out one of a plurality of mask data in the storage to display one of a plurality of mask images on the electro-optical panel when the internal information indicates that the determined one of the lottery results is one of the special lottery results corresponding to the one of the special symbols.

19. The slot machine as set forth in claim 10, wherein the reels are physical reels.

* * * * *